US006955831B2

(12) United States Patent
Higgs et al.

(10) Patent No.: US 6,955,831 B2
(45) Date of Patent: Oct. 18, 2005

(54) PROTEIN AND LIPID SOURCES FOR USE IN AQUAFEEDS AND ANIMAL FEEDS AND A PROCESS FOR THEIR PREPARATION

(75) Inventors: David Higgs, Bowen Island (CA); Robert E. Cairns, Langley (CA); Ian Shand, North Vancouver (CA)

(73) Assignee: Her Majesty the Queen in Right of Canada as Represented by the Minister of Fisheries and Oceans (CA)

( * ) Notice: Subject to any disclaimer, the term of this patent is extended or adjusted under 35 U.S.C. 154(b) by 375 days.

(21) Appl. No.: 10/076,499

(22) Filed: Feb. 19, 2002

(65) Prior Publication Data

US 2003/0072866 A1 Apr. 17, 2003

Related U.S. Application Data

(63) Continuation-in-part of application No. 09/566,728, filed on May 9, 2000, now abandoned.

(30) Foreign Application Priority Data

| Feb. 13, 2001 | (CA) | ............................................ 2334745 |
| May 8, 2001 | (CA) | ............................... PCT/CA01/00663 |
| Jun. 26, 2001 | (CA) | ............................................ 2351903 |

(51) Int. Cl.$^7$ .............................................. A23L 1/20
(52) U.S. Cl. ........................ 426/630; 426/635; 426/641; 426/643; 426/644; 426/657; 426/805; 426/807
(58) Field of Search ................................ 426/630, 635, 426/641, 643, 644, 657, 805, 807

(56) References Cited

U.S. PATENT DOCUMENTS

| 2,371,682 A |   | 3/1945 | Eisaman ..................... 426/635 |
| 2,592,348 A |   | 4/1952 | Siefker et al. .............. 426/600 |
| 2,851,357 A | * | 9/1958 | Bedford ....................... 426/330 |
| 2,904,436 A |   | 9/1959 | Auverach .................... 426/635 |
| 3,952,115 A |   | 4/1976 | Damico et al. .............. 426/590 |
| 3,965,268 A |   | 6/1976 | Stocker et al. ............. 426/331 |
| 4,148,789 A | * | 4/1979 | Kozlowska et al. ........ 530/377 |
| 4,233,210 A |   | 11/1980 | Koch .......................... 530/379 |
| 4,237,210 A |   | 12/1980 | Dougherty .................. 430/318 |
| 4,366,097 A |   | 12/1982 | Cameron et al. ........... 530/377 |
| 4,418,013 A |   | 11/1983 | Cameron et al. ........... 530/377 |
| 4,418,086 A |   | 11/1983 | Marino et al. .............. 426/302 |
| 4,496,598 A | * | 1/1985 | Sakai et al. .................. 426/417 |
| 4,702,924 A |   | 10/1987 | Owens et al. ................ 426/92 |
| 4,889,921 A |   | 12/1989 | Diosady et al. ............. 530/377 |
| 4,973,490 A |   | 11/1990 | Holmes ....................... 426/630 |
| 5,086,166 A |   | 2/1992 | Lawhon et al. ............. 530/378 |
| 5,183,683 A |   | 2/1993 | Mott et al. ................... 426/641 |
| 5,622,744 A |   | 4/1997 | Matson et al. .............. 426/623 |
| 5,705,216 A |   | 1/1998 | Tyson ......................... 426/478 |
| 5,727,689 A |   | 3/1998 | Anderson et al. ........ 209/139.1 |
| 5,773,051 A |   | 6/1998 | Kim ................................ 426/1 |
| 5,844,086 A |   | 12/1998 | Murray ....................... 530/377 |
| 6,005,076 A |   | 12/1999 | Murray ....................... 530/377 |

| 6,254,920 B1 |   | 7/2001 | Brunner ....................... 426/656 |
| 6,517,885 B2 | * | 2/2003 | Sakai et al. .................. 426/638 |

FOREIGN PATENT DOCUMENTS

| CA | 2167951 | 1/1996 |
| CA | 2244398 | 1/1997 |
| CA | 2340640 | 8/1999 |
| DE | 3927118 | 2/1991 |
| EP | 0925723 | 6/1999 |
| EP | 1074605 | 2/2001 |
| GB | 2280348 | 2/1995 |
| JP | 6326085 | 10/1988 |
| JP | 05076291 | 3/1993 |
| WO | WO 972493 | 7/1997 |

OTHER PUBLICATIONS

"FRI-71 Process" Jones, J. Amer. Oil Chem. Soc. 56 (1979) pp 716–721—process for preparation of rapeseed and canola protein.

Finfish Nutrition and Fishfeed Technology, vol. 2, Heenemann Verglagsgesellschaft MbH., Berlin, pp 191–218 Higgs, et al. (1979), J.E. Halver, and K. Tiews, eds.—diets and fecals sample preparation.

Silver, et al (1993) in S.J. Kaushik and P. Luquet, eds. Fish Nutrition in practice IVth International Symposium on Fish Nutrition and Feeding, INRA, Paris, pp. 459–468—fatty acid composition determination procedure.

Fenton and Fenton (1979) Can.J.Anim. Sci, 59, pp. 631–634—chromic acid concentration determination procedure.

AOCS Official Method ba 6–84, 1997—concentrations of crude fibre.

Troeng, S. (1995) J.A.O.C.S. 32, pp 124–126—concentration of lipid.

AOCS Official Methods Ba 12–75, reapproved 1997—measurements of trypsin inhibitor.

AOCS Official Method Ba 9–58, reapproved 1993—measurements of urease.

Mwachlreya, et al. (1999) Aquaculture Nutrition 5, pp 73–82—determination of amino acid concentrations method.

Forster, et al. (1999) Aquaculture 179, pp 109–125—determination of phytic acid levels.

(Continued)

*Primary Examiner*—C. Sayala
(74) *Attorney, Agent, or Firm*—McFadden, Fincham

(57) ABSTRACT

A process for preparation of nutritionally upgraded oilseed meals which are protein and lipid-rich and have a reduced fiber content, and plant oils from oilseeds for use in fish or other non-human animal diets or human foods comprising the steps of: providing a source of oilseed; subjecting the oilseed to heat treatment to substantially reduce the concentration of at least some antinutritional components normally present in the oilseed to obtain heat-treated seed; dehulling the heat-treated seed to produce a meat fraction, a hull fraction or a mixture thereof; and cold pressing the meat fraction or the mixture to yeild the plant oils and the protein and lipid-rich meals.

32 Claims, 2 Drawing Sheets

OTHER PUBLICATIONS

Higgs, et al. (1982) Aquaculture 29, pp 1–31—plasm spectroscopy.

Duan and McGregor (1981) Glucosinolate Anlysis of Rapeseed (Canola). Method of the Canadian Grain Commission Revised Edn. Grain Research Laboratory, Canadian Grain Commission Winnipeg, Manitoba Canada—method to determine concentrations of glucosinolate.

Himadri, et al., "Effects of formulation and processing variables on dry fish feed pellets containing fish waste" Journal of the Science of Food and Agriculture, vol. 61, pp. 181–187, 1993 Elseiver Applied Science Publishers, Barking GB.

Veldsink, "Heat Pretreatment of Oilseeds: Effect IB IUK Quality" Jul. 1999.

Database WPI, Section Ch, Week 1994 21—Apr. 28, 1994, Csernitzky K., et al. "Preparation of soil nutrient contain compose residue vegetable oil effluent sludge sunflower seed husk straw liquid manure"—XP-002185811.

Hajen, et al. (1993) a, b Aquaculture 112, pp 321–348—design of digestability tanks and fecal collection procedures.

Cho et al. (1985) Finfish nutrition in Asia: methodological approaches to research and development, IDRC, Ottawa, ON Canada, p. 154—diet and lyophyillized fecal sample analysing procedures.

Forster (1999) Aquaculture Nutrition 5, pp. 143–145—calculation of digestability co-efficients.

Hui, Y.H.: "Bailey's Industrial Oil & Fat Products, vol. 4 Edible Oil & Fat Products Processing Technology" 1996, John Wiley, NY, NY U.S.A., p. 603–630; XP-002185810.

M. Ristic et al., "Protein meal obtained from small fish by extrusion" ACTA Veterindria, vol. 49, No. 1, 1999, pp. 57–64 XP-001042120.

* cited by examiner

PROTEIN AND LIPID SOURCES FOR USE IN AQUAFEEDS AND ANIMAL FEEDS AND A PROCESS FOR THEIR PREPARATION

This application is a Continuation-In-part application of U.S. Ser. No. 09/566,728, filed May 9, 2000, now abandoned, and claims priority to Canadian patent application serial number 2,351,903 filed on Jun. 26, 2001 and International Patent Application Number PCT/CA01/00663 filed on May 8, 2001 which claims priority to Canadian patent application serial number 2,334,745 filed on Feb. 13, 2001.

FIELD OF THE INVENTION

The present invention relates to a novel process for the production of nutritionally upgraded protein and lipid sources for use in aquafeeds and other animal feeds. More specifically, the present invention relates to a process involving the co-processing of animal offal(s) with oilseed(s); the invention also relates to products produced thereby. Other embodiments of the present invention relate to novel oilseed protein concentrates and novel protein and lipid-rich oilseed meals, as well as novel oilseed oils produced using the process of the present invention.

In addition, the invention relates to cold pressed plant oils suitable for organic human foods, as well as products for use as components in organic fertilizers, both produced by the process of the invention.

BACKGROUND OF THE INVENTION

Feed accounts for on average 35–60% of the operating costs of salmon farms and it represents the largest cost in the culture of other carnivorous aquatic species. Moreover, the protein sources presently used account for the majority of the feed cost. Accordingly, salmon farming profitability is marginal in many regions. Hence, there is a need to reduce production costs and improve the market value of the farmed product.

Currently, aquatic feeds contain high levels of fish meal and oil, which are mostly imported, to produce a protein-rich and sometimes lipid-rich (e.g. salmon diets) aquatic feed. However, as noted hereinabove, such fish meal and oil can be very expensive and this will be especially true in the future due to progressively increasing demands that are being placed on the finite global supplies of fish meal and oil. Hence, alternative economical sources of protein and lipid are required.

One known approach is to use less expensive plant protein sources in aquafeed that have been specially processed so that they are in the form of nutritionally upgraded protein meals, concentrates, and isolates. These may be used either singly or in combination with rendered animal protein ingredients such as poultry-by-product meal. To date, each of these protein products, such as canola meal, soybean meal, and poultry-by-product meal have been processed (produced) separately and then these protein sources have been blended together in dried and finely ground form in appropriate ratios for a particular aquatic species at the time of diet formulation and preparation.

Most research on oilseeds has focussed on the use of products derived from processing soybeans, rapeseed/canola, sunflower seed or cottonseed. Comparatively few of these studies, however, have been directed to assessing the feasibility of using canola, flax seed, mustard seed, hemp and the like. Indeed, in the case of canola for example, although proteins contained therein are rich in lysine and methionine, both of which are limiting amino acids in most cereal and oilseed proteins, its use as a protein source in food products has been severely limited, due to the fact that the proteinaceous material which is left over after oil is extracted by known processes contains antinutritional constituents. The latter include insoluble and soluble fibres, glucosinolates (antithyroid compounds), phenolic compounds and phytic acid.

It has been shown that the concentrations of the above mentioned unwanted constituents should be minimized in order to allow full expression of the high quality of oilseed protein and to improve the overall digestibility, palatability, as well as bioavailability of minerals in the oilseed protein product. This is highly desirable when feeding either terrestrial species or aquatic species.

U.S. Pat. No. 4,418,086 to Marino et al. discloses the preparation of an animal feed which comprises (a) a proteinaceous matrix, (b) fat or oil, (c) a sulfur source, (d) farinaceous material, (e) a plasticizer and (f) water. The method disclosed involves the blending of the ingredients together, introducing the mixture into an extruder and subjecting it to shear forces, mechanical work, heat and pressure such that the product temperature prior to discharge is at least 280 degrees F. This patent is concerned with the production of an animal feed with a "meat like texture".

U.S. Pat. No. 3,952,115 to Damico et al. relates to a feed where an amino acid is utilized as an additive to fortify a proteinaceous feed.

U.S. Pat. No. 4,973,490 to Holmes discloses the production of animal feed products utilizing rape seed in combination with another plant species.

U.S. Pat. No. 5,773,051 to Kim relates to a process for manufacturing a fish feed which refloats after initially sinking. This document discloses a process including blending conventional fish feed containing fish meal, wheat meal, soybean meal and other substances and compressing the mixture at a constant temperature to produce a molded product.

Furthermore, U.S. Pat. No. 4,233,210 to Koch and U.S. Pat. No. 4,889,921 to Diosady et al. disclose preparations of protein concentrates for use in animal or human nourishment, from oilseeds including rapeseed (canola). The various processes of these inventions generally comprise heating, drying and distillation steps, as well as treatments with alkaline solutions and extractions with organic solvents.

The protein extract claimed by Cameron et al. in U.S. Pat. Nos. 4,418,013 and 4,366,097; and by Murray et al. in U.S. Pat. Nos. 5,844,086 and 6,005,076 is said to be "protein isolate", which is regarded as being different from a protein concentrate. Indeed, it is established that a protein extract is an isolate when the protein content exceeds 90% and the protein is undenatured. Accordingly, the process of the preparation of an isolate does not allow for a heating step at elevated temperature.

Lawhon et al. in U.S. Pat. No. 5,086,166 disclose a process allowing for the simultaneous preparation of protein as precipitate or curd, and oil for use as food products or food ingredients, from numerous oilseeds including soybeans, glandless, cottonseeds, sunflower seeds, peanuts and sesame seeds. At an early step of the process, a heating treatment (at about 60° C. to 90° C.) of the material in water is performed, in order to inactivate enzymes inherent in the seed.

A process for the preparation of rapeseed and canola protein concentrates known as the "FRI-71 process" has been described by Jones (J. Amer. Oil Chem. Soc. 56, 1979, 716–721). This process allows for the production of highly digestible protein concentrates with reduced levels of anti-nutritional factors (except for phytic acid) that can be used to entirely replace the fish meal portion of diets for trout. However, subsequent work conducted in collaboration with the POS Pilot Plant Corporation in Saskatoon revealed that the FRI-71 process was not cost effective, due to low yields of the concentrates, and insufficient numbers of other value-added products apart from canola oil stemming from the process. Also, the process as described could not easily be applied in the private sector using existing oilseed and fish meal processing technology.

In the present invention, a modified FRI-71 process is described that results, besides the high value canola protein concentrate and animal feed grade canola oil, in other value-added products such as canola oil suitable for the organic food market, nutritionally upgraded canola meal, and products suitable as components in organic or predominately organic fertilizers. The process of the invention is simple and economical. Moreover, the process is readily integrated into existing oilseed crushing plants or fish meal production plants.

The process described in an embodiment of the present invention is further extended to various oilseeds including canola, rapeseed, sunflower seed, flax seed, mustard seed, cottonseed, hemp and soybeans. Moreover, mixtures of different oilseeds are also used in the process.

An object of the invention for certain embodiments is to provide an improved process for extracting protein and oil (human and animal feed grade) from oilseed. A further object of other embodiments is to provide protein products that are particularly well suited for use in high energy (lipid) diets for fish farming and in some animal feeds.

SUMMARY OF THE INVENTION

In the present invention, there are several different aspects represented by different process aspects, as well as several novel product compositions resulting from different process aspects.

Dealing initially with the process aspects, there is provided a first aspect involving the preparation of nutritionally upgraded oilseed meals, which are protein and lipid-rich and have a reduced fibre content, and plant oils from oilseeds for use in fish or other non-human animal diets or human foods. This process comprises the steps of:

providing a source of oilseed;

subjecting said oilseed to heat treatment to substantially reduce the concentration of at least some antinutritional components normally present in said oilseed to obtain heat-treated seed;

dehulling said heat-treated seed to produce a meat fraction and a hull fraction or a mixture thereof; and cold pressing said meat fraction or said mixture to yield said plant oils and said protein and lipid-rich meals.

According to one aspect of the present invention, there is provided a process for preparation of nutritionally upgraded oilseed meals, which are protein and lipid-rich and have a reduced fibre content, and plant oils from oilseeds for use in fish or other non-human animal diets or human foods comprising the steps of:

providing a source of oilseed;

subjecting said oilseed to heat treatment to substantially reduce the concentration of at least some antinutritional components normally present in said oilseed to obtain heat-treated seed;

providing a source of unhydrolyzed animal offal;

blending said heat-treated seed in particulate form with said animal offal, and if required water together with an antioxidant, to form a mixture thereof;

cooking said mixture under conditions selected to substantially improve protein digestibility, and substantially free cellular water present in said animal offal, and if required as well as to facilitate separation of protein from the lipid in said oilseeds to obtain a cooked mixture; and separating said cooked mixture into a stickwater fraction, a moisture containing protein-rich fraction, and an animal feed grade oil fraction.

In another aspect of this invention, the above-described aspect can be modified as described herein to provide another process aspect. In particular, in the above aspect, the modifications involve the preparation of protein concentrates and lipid sources from co-processing of animal offal with oilseed for use in fish or other non-human animal feeds, wherein a cold pressing step of said meat fraction or said mixture obtained from the first aspect above is carried out so as to substantially reduce the particle size of the meat or the mixture and to yield a high value human grade oil and a protein and lipid-rich meal with reduced fibre content. Thus, this additional aspect of the process comprises the further steps of:

providing a source of unhydrolyzed animal offal;

blending said protein and lipid-rich meal with said animal offal, and if required together with an antioxident to form a mixture thereof;

cooking said mixture under conditions selected to substantially improve protein digestibility, and substantially free cellular water present in said animal offal, as well as to facilitate separation of protein from the lipid in said animal offal and said oilseeds to obtain a cooked mixture; and separating said cooked mixture into a stickwater fraction, a moisture containing protein-rich fraction, and an animal feed grade oil fraction.

In the first aspect of the process, as an optional feature, the process may further include the step of extracting said protein and lipid-rich meals with a solvent, and the step of stabilizing said plant oils by adding an antioxidant.

Further, there may also be included the step of drying the protein-rich fraction to reduce its moisture content to below about 10%. Moreover, the moisture content can be between 6% to 9%.

In yet another aspect of the present invention, there is provided a process for preparation of oilseed protein concentrates from oilseed for use in fish or other non-human animal diets comprising the steps of:

subjecting the oilseed to heat treatment under conditions selected to substantially deactivate, destroy or reduce the concentration of at least some of the antinutritional components normally present in oilseed to produce heat-treated seed;

dehulling the heat-treated seed to produce a meat fraction and a hull fraction;

cold pressing the meat fraction to yield a high value human grade oil and a moisture containing protein and lipid-rich meal having a reduced fibre content;

blending the protein and lipid-rich meal with water and an antioxidant to produce a blended mixture;

cooking the blended mixture under conditions selected to substantially improve protein digestibility to obtain a cooked mixture; and separating the cooked mixture into a stick water fraction, a moisture containing protein-rich fraction, and an oil fraction.

Further, in the above aspect of the process, the process may optionally include the steps of subjecting the protein and lipid-rich meal to enzymatic pH adjusted water treatment under conditions selected to substantially decrease the phytic acid concentration normally present in oilseed to thereby produce a protein and lipid-rich meal having reduced phytic acid and fibre contents.

Moreover, in the above embodiment, a further step of effecting a delay prior to subjecting the blended mixture to the cooking step.

Optionally, a step involving the initial sterilizing of the oilseed may be performed and the sterilization step can be performed using infrared energy.

There may be also included the step of cooking the mixture to obtain a cooked mixture prior to the extracting step. In this embodiment, there may be further included the step of separating the cooked mixture into a stickwater fraction, a moisture containing protein-rich fraction, and an animal feed grade oil. If desired, there also may be provided the step of drying the protein concentrate.

In another preferred embodiment, In any of the above process aspects, desirably the heat treatment is a rapid heat treatment. The heat treatment may be carried out in one or more stages—for example, a two stage heat treatment can be employed where temperatures range from about 100° C. to 115° C., and for treatment times ranging from 1.5 minutes to 30 minutes or more depending on the specific components being treated.

Particularly, suitable for any of the above process aspects, is where the oilseed is selected from the group consisting of canola, rape seed, soybeans, sunflower seed, flax seed, mustard seed, cotton seed, hemp and mixtures thereof. In the first process aspect, the oilseed may be selected from the group consisting of canola, sunflower seed, flax seed, mustard seed, and mixtures thereof. In the event the oilseed is a commercially available processed ground oilseed meal, the initial steps involving rapid heat-treatment and cold pressing are deleted.

Preferably, the animal offal may be selected from the group consisting of fish processing waste, whole fish, fish by-catch, squid offal, whole birds without feathers, beef offal, lamb offal and mixtures thereof. Particularly suitable is where the animal offal is a fish product or poultry or tail-end dehulled meal (fibre-reduced). For instance, squid offal, poultry offal without feet, and whole birds including chickens, turkeys and others without feathers can be used. The fish offal or whole fish utilized include fish species having low levels of chlorinated hydrocarbons and heavy metals such as mercury. The animal offal can be a minced unhydrolyzed animal offal. The process may also include the step of dehulling the heat-treated seed and the blending step may include adding hot water to the mixture.

The dehulling step may be carried out by a mechanical treatment with a gravity screening or air-classification step and may also further include a seed sizing step. Optionally the oilseed can be treated by suitable techniques to remove the outer mucilage layer of the seed coat before the seed is used; the oilseed used includes flax seed. Especially when producing aquatic feeds, oilseed can be selected from canola, soybeans, sunflower seed, hemp or delinted cotton seed or mixtures thereof is used, due to their global availability, cost, and/or high quality of protein and/or lipid.

The cooking step may be performed at a temperature of from about 90° C. to about 93° C. and may further include the step of adding an antioxidant and/or a palatability enhancer to the cooked mixture. The antioxidant can be selected from the group consisting of ethoxyquin (santoquin), butylated hydroxyanisole (BHA), butylated hydroxytoluene (BHT), tertiary butyl hydroquinone, natural antioxidants and mixtures thereof. One or more of the foregoing antioxidants are also added to the dried protein concentrate, and the animal feed grade lipid fraction. In the case of the former, the amount of antioxidant utilized is from about 200 ppm to about 250 ppm whereas the latter is supplemented with about 250 ppm to about 500 ppm antioxidant(s). Combinations of BHA and ethoxyquin or ethyoxquin alone at highest level is used. The palatability enhancer may be selected from the group consisting of natural and synthetic products based on krill, euphausiids and derivatives thereof, squid, Finnstim™ and mixtures thereof. Other ingredients such as enzymes, fillers, as well as other sources of lipid of plant or animal origin and other protein sources such as heat-treated field peas or lupins may be added to the composition of the mixture.

The oilseed and the animal offal in any of the above process aspects can be mixed together in a ratio of about 10:90 to about 90:10 by weight. It can be seen that the mixed ratio can be from about 25:75 to about 75:25 by weight or from about 60:40 to about 40:60 by weight.

The amount of oilseed present in the mixture depends upon the sources of oilseed and animal offal actually used. This amount also depends on respective attendant concentrations of protein and lipid, as well as costs. For instance, the oilseed can be present in a range of about 5% to about 78% by weight. More particularly, the oilseed can be present in the amount of about 22% to about 78% by weight, or the range of about 40% to about 60% by weight. It is important to maintain an optimal ratio of water (from endogenous and exogenous sources) to the oil-free dry matter content of the oilseed in the initial mixture and usually this is found within the range of about 3–6:1 w/w. Ratios within this range facilitate the removal of water soluble antinutritional factors from the oilseed (in press liquor).

The mixture is further pressed and/or centrifuged using respectively either a screw press equipped with perforated screens, an expeller equipped with flat steel bars set edgewise around the periphery and spaced to allow the fluids to flow between the bars, a decanter centrifuge or any combination of these. Depending upon the efficiency of liquid/solid separation the mixture is centrifuged before or after the presscake has passed through the screw press or expeller. This part of the process removes fluids generally comprised of water that contains some soluble protein and water soluble antinutritional factors stemming from the oilseed such as glucosinolates, phenolic compounds and unwanted sugars including oligosaccharides (raffinose and stachyose). Animal feed grade plant oil that is enriched with fatty acids from the animal offal lipid is also removed.

The drying step in any of the above process aspects may be performed at a temperature of between about 70° C. to about 85° C. As mentioned above, the separation step may be carried out in a screw press, expeller press or decanter centrifuge, or any combination thereof. As an optional feature, the stickwater fraction obtained after separation may be further condensed to yield condensed solubles. The step of stabilizing the condensed solubles can be with an Inorganic acid.

The step of incubating the mixture in the presence of one or more enzymes prior to the cooking step may further be included. An enzyme which can be used includes the enzyme phytase.

When a palatability enhancer is utilized, it may be selected from conventional products based on krill, euphausiids, and/or squid or other like palatability enhancers such as Finnstim™ or the like. The palatabiity enhancers may be added to the dried protein concentrates in amounts ranging from about 1% to about 3% by weight.

The cooking step is carried out using a heat exchanger or through direct steam injection coupled with batch processor. The process may further comprise, if desired, the initial step of deboning the animal offal to produced deboned animal offal and bones.

The cold pressing step should be carried out at a temperature not exceeding 85° C., desirably below about 70° C.

The source of the oil seed utilized is most desirably a commercially available particulate processed oil seed meal, which has not been previously subjected to initial rapid heat treatment or cold processing.

The extraction step may be carried out at least twice; the solvent that can be used includes hexane.

The processes which involve processing of oilseed prior to co-processing it with animal offal, can utilize the addition of hot water (from about 37° C. to about 55° C.) to ground oilseed, followed by adjustment of the pH to a value of from about 5.5 to about 6.0 using an inorganic acid such as sulphuric acid; this treatment being carried out in the presence of an enzyme such as the enzyme phytase.

The various processes of the present invention can be economically and readily carried out using conventional equipment. Such processes will provide cost effective products which can be used in place of or added to other known products in order to achieve additional sources of the desired ingredients for use in fish or other non-human animal diets or human foods. The use of inexpensive fish wastes and other animal offal in the various processes of the present invention is a positive way to deal with waste streams rather than considering them as a liability.

As described hereinafter, it will be seen that the different processes can be combined into one overall procedure allowing separation of products at various stages of the process.

Optionally, the oilseed can be partially or totally dehulled.

Protein and lipid rich meals can be produced in a very economical manner and will find utility in fish and animal feeds requiring high protein and lipid rich meal with reduced concentrations of fibre and heat-labile antinutritional factors. Their utility will depend on various factors such as the species of animal or fish and their respective requirements for protein and energy, etc. As described previously with respect to other animal and fish feed sources, the products of this aspect of the invention can be incorporated into the feeds of animal and fish as replacements for conventionally processed oilseed meals and oils, and fish meals and oils. Due to the protein and lipid rich content of such products, a beneficial result will be obtained in the increased digestible energy content of diets for such animals and fish. The protein concentration can also be increased in the preceding meals through removal of lipid by solvent extraction which increases their utility as components in low energy diets for animals and fish.

It will be understood that reference to the above described aspects which are suitable for animal and fish feeds, refers to products which can be used by numerous types of species. For example, depending on the geographic location, fish feeds are used in fish farming operations for salmon, trout, tilapia, carp, catfish, sea bream and many other warm water as well as cold water species of commercial importance. In the case of animal feeds, conventional farming practices utilize such feeds for poultry, hogs, swine and cattle.

In further explanation of the various embodiments of the process aspects of the present invention, the solvent used for extracting the mixture obtained from co-processing of oilseed and animal offal includes hexane or other compatible In various embodiments of the process aspects of the present invention, the ash content in the protein concentrates can be regulated as desired by controlling the concentration of bone in the animal offal. Thus, the ash can be controlled by using a deboning step to obtain offal with the desired bone content. Bones in wet or dry form of different types of offal can be utilized, with varying degrees of bone coarseness. By way of example, the ash content can thus be controlled by controlling the amount of bone added to the mixture of ailseed and animal offal.

In the process aspects of the present invention, when referring to animal offal such as birds or chickens, it is to be understood that a most preferred embodiment is the use of offal without bird feathers.

In the process aspects of the present invention, when using dehulled seeds, the term "dehulled" is intended to mean seeds which have substantially all of their hulls removed. However, in many cases, partially dehulled seeds can be employed as otherwise noted herein, and to this end, dehulled seeds are those which have had at least 55% of their hulls removed.

As used in the specification, the term "unhydrolyzed" in describing the animal offal refers to animal offal which has less than about 20% by weight of hydrolyzed content, desirably less than 5% and most desirably no hydrolysis whatsoever (fresh, unspoiled). In most preferred embodiments, the amount of hydrolyzed content is as close as possible to 0% in order to best achieve the highest nutritive value in the products that are formed.

In this invention, the animal offal is preferably in a particulate form such as that which would be obtained by processing procedures resulting in minced offal. Well known techniques in the offal processing art can be employed to obtain such minced offal.

BRIEF DESCRIPTION OF THE DRAWING

Having generally described the invention, reference will be made to the accompanied drawing which illustrates the preferred embodiments only.

DETAILED DESCRIPTION OF THE INVENTION

Figure 1:
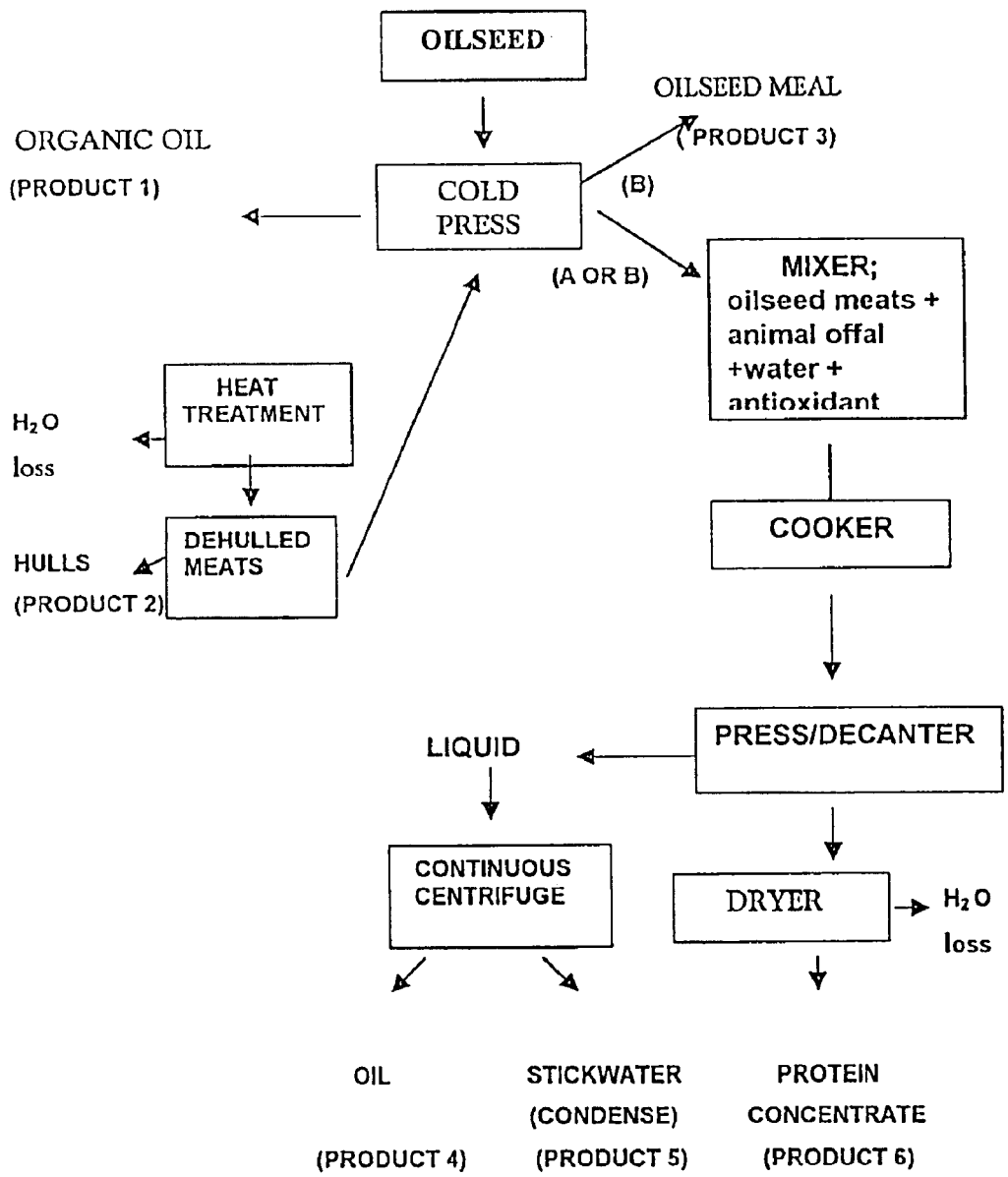
FIG. 1 is a schematic representation of the process according to the present invention.

The steps involved in the process of the invention are broadly represented in FIG. 1. In this Figure, there is illustrated a schematic representation of the co-processing of animal offal(s) with oilseed(s) to yield cold pressed oil indicated as product 1; hulls from dehulled oilseed meats indicated as product 2; nutritionally upgraded oilseed meal produced from heat treated, dehulled and cold pressed oilseed indicated as product 3; animal-feed grade oil indicated as product 4; condensed solubles indicated as product 5; and high nutritive value protein concentrate indicated as product 6. Other products of the invention are obtained by further processing the above-mentioned products as will be described in greater detail hereinafter.

In accordance with certain embodiments of the invention, undehulled oilseed (A) is used in the process. Other embodiments involve dehulled seed (B) and raw seed. Dehulled seed is preferred when it is desired to feed monogastric species such as fish and poultry, and the preferred raw seed used in this embodiment includes canola, sunflower, or delinted cottonseed. Undehulled oilseed (A) or dehulled oilseed (B) for monogastric diets may be used.

Figure 2:
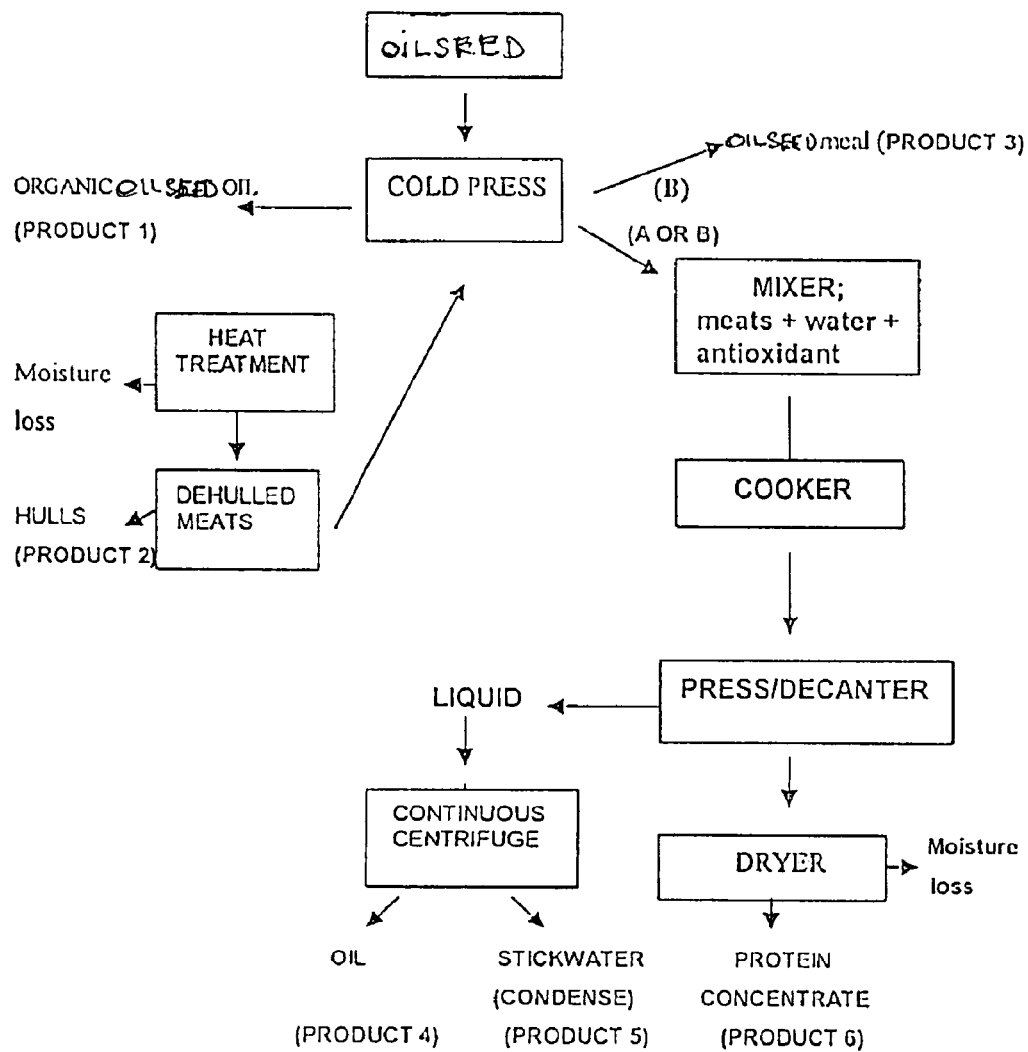
FIG. 2 is a schematic representation of the process according to a preferred embodiment of the present invention.

With respect to FIG. 2, the subsequent steps are provided for with respect to an optional lipid extraction and solvent recovery step can be inserted to reduce the lipid content of the oilseed meal and just before or after press cake drying to reduce the lipid content of the protein concentrate.

The initial step involves cold pressing (temperatures <85° C. using a suitable cold press) the rawwhole oilseed or alternatively subjecting the raw seed to rapid heat treatment and then dehulling and cold pressing the heat-treated seed. If the latter option is selected, one procedure involves heating the seed at 110–115° C. for 90 seconds followed by an additional heating at 100–110° C. for 30 min. Other options require less heat depending upon the form of heat and whether or not a vacuum is applied during the heat process. The temperature and length of the treatment is selected to substantially: (i) deactivate or destroy the activity of enzymes such as myrosinase, which is the enzyme responsible for glucosinolate hydrolysis in canola; (ii) improve the digestibility or bioavailability of the carbohydrates present in canola and other oilseeds; and (iii) reduce the moisture content in the seed, which results in a partial separation of the meat from the fibrous indigestible hull.

The dehulling process is further completed by subjecting the heat-treated seed through an impact, a disc, or other mechanical process coupled with a gravity screening or air-classification process. Other techniques may also be used in the dehulling process, and some of these may include sonic techniques.

The oilseed meats resulting from the cold pressing of the raw, unheated seed are not marketed directly for use in high energy animal feeds, unlike those originating from the cold pressing of heated, dehulled seed. Indeed, the latter have been nutritionally upgraded due to their reduced content of fibre and one or more heat-labile antinutritional factors. This meal contains about 30–33% protein and 30–38% lipid. It may be used as is or it may be further subjected to solvent extraction involving hexane, with subsequent recovery of the solvent and the meal to reduce its lipid content, thus elevating its protein concentration. The meal may be directly channelled into diets of aquatic and terrestrial species, or similar to the meal from the unheated, pressed seed, submitted without lipid extraction to the next step of the process. The cold pressed oils from both sources, however, are channelled into the organic human food market.

The meals from undehulled or dehulled oilseed are blended with a suitable amount of water (about 4–8:1 w/w water to oil-free dry matter of meal) and an antioxidant (e.g. 100 mg of santoquin/kg of meal). The added water serves to wash the oilseed meal as the blend moves through the cooker to either a continuous screw press that is surrounded with perforated screens or an expeller press. As the presscake moves through this stage of the apparatus, fluids are drained off that include water that contains soluble protein, some of the remaining water soluble antinutritional components such as glucosinolates (when canola is used), phenolic compounds and unwanted sugars like raffinose and stachyose; as well as a large portion of the lipid fraction. The mechanical separation of the aforementioned solids and liquid fractions may also involve the use of a decanter centrifuge depending upon the efficiency of liquid/solid separation after the presscake has passed through the screw press or expeller.

Thereafter, the fluid mixture is separated by continuous centrifuge into stick water and animal feed grade oil fractions (the latter may be subjected to additional processing steps as referred to previously to create a human grade oil). The press-cake meal is dried using a low temperature process (temperature of about 60° C. to about 83° C.) to yield a dried protein-rich fraction (concentrate).

In cases where the lipid content of the dried protein fraction is too high for the desired animal feed use, a solvent extraction step involving hexane is performed, with subsequent recovery of the solvent and the animal feed grade oil. In another embodiment of the invention, the solvent extraction step is performed prior to the low temperature drying step.

The stick water fraction mentioned above is condensed to about a third of its original volume and following acid stabilization, is then used together with the hulls as components in organic fertilizers for agriculture.

The oilseed in accordance with the present invention is selected from canola, rape seed, soybeans, sunflower seed, flax seed, mustard seed, cotton seed and hemp or mixtures of these oilseeds. The oilseed used in the process of the invention can also consist of a mixture of two or more different oilseeds selected from the above-mentioned oilseeds. A suitable selection of oilseeds to be mixed together in the process will provide for products with enhanced nutritional values. With respect to the protein product, the amino acid profile can be obtained through amino acid complementation. Further, oil could be upgraded through, for example using a mixture of oleic acid, sunflower or yellow mustard with flax seed and/or canola. Such oil would have high oleic acid content and low or intermediate concentrations of linolenic acid. Also, these oils will have reduced concentrations of linoleic acid.

In accordance with the invention, oilseeds having a high content of phytic acid, such as canola, sunflower and hemp can be subjected to enzymatic pH adjusted water treatment prior to being used in the process. This pretreatment involves adjustment of pH to about 5.0 to about 5.5 and addition of enzyme phytase. The oilseeds in particulate form are incubated with phytase for about 4 hours or more, at a temperature of about 50° C. to about 55° C. In the case of hemp, the seeds have to undergo a sterilization step, to prevent germination and this may be accomplished by using infrared energy or other suitable techniques. The dehulling step is imperative in the case of flax seed. Alternatively, removal of at least the mucilage layer in the outer seed coat should be carried out.

When sunflower or canola is used in the process of the invention in the production of protein concentrates, the heat treatment step may be avoided, however, in order to facilitate dehulling (specifically if mechanical dehulling is being performed), the seeds are subjected to a drying step, to reduce their moisture content to about 5%.

Given the above teachings, it will be seen that the invention also provides protein concentrates produced by the above process, containing from about 50% to about 78% protein, that are highly digestible and significantly depleted in antinutritional constituents (except for phytic acid in some cases if the seeds are not pretreated with phytase) that were present in the original oilseed. The oilseed protein concentrates of the present invention have moderate contents of lipids (from about 5% to about 12%) that include highly digestible monounsaturated and polyunsaturated fatty acids. The following examples are presented to describe embodiments of the invention and are not meant to limit the invention unless otherwise stated.

Examples 1 to 10 outlined below described each step involved in the process of the invention:

EXAMPLE 1

Animal Offal

A common batch of whole Pacific herring was used as the main source of animal offal for the project. Soon after the herring were caught, they were rapidly block frozen by McMillan J. S. Fisheries Ltd., Vancouver, BC and stored at −40° C. for about 9 months. At this time, about 500 kg of herring were transported to the Department of Fisheries and Oceans, West Vancouver Laboratory where they were held at −20° C. until small batches of about 50 kg were partially thawed for each test run. The thawed herring were cold extruded using a Butcher Boy equipped with an auger, cutter knife, and perforated plate having holes with diameter 9.52 mm.

Fresh poultry offal (heads and viscera minus feet) was also used for some trials that involved co-processing the offal with partially dehulled animal feed grade sunflower seed (designated as batch 2 hereinafter). The offal was obtained from West Coast Reduction Ltd., Vancouver, BC and was stored for one night at −20° C. under cover before being handled as described above for the herring.

EXAMPLE 2

Oilseeds

The four oilseeds that have been tested successfully in this project include Goliath canola seed (Cloutier Agra Seeds Inc., Winnipeg, MB), soybeans (InfraReady Products Ltd., Saskatoon SK), sunflower (completely dehulled confectionary grade seed obtained from North West Grain, St. Hilaire, Minn., USA (batch 1) and undehulled animal feed grade seed obtained from Cargill Incorporated, Wayzata, Minn., USA; batch 2), and devitalized hemp seed (SeedtecITerramax, Qu'Appelle, SK sterilized by InfraReady Products Ltd., Saskatoon SK). Delinted glandless cottonseed (California Planting Cottonseed Distributor, Bakersfield, Calif., USA) and brown flax (InfraReady Products Ltd., Saskatoon, SK) were also tested in the process. The analytical results pertaining to products based on the former are pending. It was concluded that flax seed would be suitable for the process provided that the seed is almost totally dehulled or the outer mucilage layer of the seed coat is removed through an economical process.

EXAMPLE 3

Heat Treatment or Micronization of Oilseeds

In a preferred embodiment of the invention, specially for canola, soya, flax and hemp, an initial heat treatment was performed. The process involved subjecting the whole seeds to infrared energy so that the seed temperature reached 110–115° C. for 90 seconds. Subsequently, the micronized seeds were held for 20–30 min, depending upon the seed source, in an insulated tank where temperatures ranged from 100–110° C. (residual cooking conditions). These conditions inactivated enzymes such as myrosinase in canola and trypsin inhibitors in soya as well as peroxidase and cyanogenic glucosides. Further, they ensured devitalization of viable germ tissue in hemp, improved starch digestibility, and destroyed or reduced the concentrations of heat labile antinutritional factors other than those mentioned above.

Sunflower seeds (batches 1 and 2) were not micronized before co-processing with animal offal but the batch 1 seeds were dried to £ 10% moisture to ensure proper seed storage and facilitate dehulling. Thus, only non-micronized dehulled sunflower seeds were tested in this study.

EXAMPLE 4

Oilseed Dehulling

Micronized canola, soya, hemp and flax and non-micronized animal feed-grade sunflower were dehulled. The process involved seed sizing, impact dehulling (Forsberg model 15-D impact huller), screening and air classification (Forsberg model 4800-18 screener and screen-aire).

EXAMPLE 5

Oilseed Cold-Pressing

In a preferred embodiment of the invention, the oilseeds (micronized or raw), except soya and micronized dehulled hemp were cold-pressed at a temperature not exceeding 85° C., using a Canadian designed and manufactured laboratory scale Gusta cold press (1 HP Model 11, Gusta Cold Press, St. Andrews, Manitoba, Canada). This served to remove some (dehulled seeds) or a significant proportion (undehulled seeds) of the residual oil (organic human food grade oil) and concomitantly reduced the particle size of the oilseed before it was co-processed with minced animal offal in various proportions (improved the efficiency of the subsequent aqueous extraction of the water soluble antinutritional factors and oligosaccharides present in the oilseed).

In a more preferred embodiment, specially for soya, the particle size was further reduced, using a modified crumbler (model 706S, W. W. Grinder Corp., Wichita, Kans.). This machine was equipped after modification with dual motorized corrugated rolls. One of these had a fixed speed whereas the speed of the other could be varied. For the purpose of this investigation, the variable speed roller was adjusted to rotate much faster than the fixed speed roller to achieve a shearing action.

EXAMPLE 6

Mixing or Co-Processing Step

Thawed, ground, whole animal offal (mostly herring, but in two cases poultry offal minus feet, was used) and oilseeds that had been micronized or dried as described in Example 3 or in raw form and either cold pressed or ground as described in Example 5 were first combined in various proportions. In preferred embodiments, the usual percentages of offal to oilseed were 75:25; 50:50; or 25:75 (w/w). Thereafter, 100 mg of santoquin (antioxidant) per kg of mixture in a marine oil carrier (1 g/kg) were added. Then hot water was added to the mixture in such a way that the ratio of water to oil-free dry matter present in the oilseed was maintained between 3–6:1 (w/w), depending upon the source and proportion of oilseed in the mixture. Both the endogenous water originating from the offal and the exogenous water were considered when calculating the aforementioned ratios.

EXAMPLE 7

Cooking Step

The mixture obtained from co-processing of animal offal and oilseed (Example 6) was cooked for about 27 min at 90–93° C. in the steam jacketed cooker section of a pilot-scale fish meal machine (Chemical Research Organization, Esbjerg, Denmark), that was equipped with a heated auger (it is noteworthy that the cooking step could have also been performed by using a heat exchanger with a positive displacement pump or through direct steam injection coupled with processor). The cooking step was undertaken to: (1) minimize the loss of soluble protein through protein denaturation, (2) destroy or reduce the concentration of heat labile antinutritional factors present in the oilseed (especially important when processing non-micronized seeds and micronized soya), (3) liberate the bound cellular water and lipid in the offal and the oilseed, and (4) subject the oilseed to aqueous washing to facilitate removal of the water soluble antinutritional factors originating from this source.

EXAMPLE 8

Pressing Step

Significant but not total removal of the latter as well as lipid (animal-feed grade product) was accomplished by passing the cooked mixture through the fish meal machine screw press that was equipped with perforated screens and then a laboratory-scale press (Vincent model CP4; Vincent Corp., Tampa Fla.). Constituents in the water fraction of the press liquids consisted of water soluble carbohydrates such as monosaccharides, disaccharides, or problem sugars like raffinose and stachyose, phenolic compounds, glucosinolates (when canola used), chlorogenic acid (when sunflower used), isoflavones and saponins (when soybeans used) as well as some soluble nitrogen and water soluble vitamins. In preferred embodiments, the presscake in each case was dried in the steam jacketed drier portion of the above-mentioned fish meal machine at 75–83° C. to produce dried protein and lipid-rich products.

EXAMPLE 9

Drying Step

In one preferred embodiment, further drying of the protein products was necessary to reduce their moisture content. The drying was performed for about 30 min to reduce their moisture content to less than 10%. This was accomplished using a custom designed vertical stack (stainless steel mesh trays) pellet cooler that was equipped with two electric base heaters and a top mounted variable speed fan. The temperature of the upward drawn air was maintained between 70° C. and 80° C. during the process. All protein and lipid sources stemming from the above process, including the cold-pressed oils were further stabilized with santoquin (ethoxyquin). In a more preferred embodiment, specially in the case of the dried protein products, 100 mg of santoquin were added per kg of product in a marine oil carrier (1 g/kg). Then, each of the products was vacuum packaged in oxygen impermeable bags and stored at −20° C. pending chemical analysis or their evaluation in a digestibility trial (see below). In another embodiment, specially in relation to the oils, 500 mg of santoquin were added per kg and then each lipid source was stored at 4–5° C. in 1 L black plastic bottles.

EXAMPLE 10

Separation Step

In preferred embodiments, the press liquid was separated into water and lipid fractions using an Alpha de Laval batch dairy centrifuge (Centrifuges Unlimited Inc., Calgary, Alberta). Then, the water fraction was condensed to about one third of its original volume using a steam jacketed bowl cooker.

EXAMPLE 11

Preparation of Protein Concentrates

Protein concentrates that are mostly based on protein from canola, soya, sunflower and hemp were prepared by hexane extracting the products that originated from the co-processing of 1:1 combinations of whole herring and each of the preceding oilseeds. In this regard, 200 g of each of the four protein products were extracted four times with hexane (5:1 v/w). During each extraction, the mixture was held for 30 min (stirred once after 15 min) before being filtered through Whatman No. 1 filter paper in a Buchner funnel. Following hexane extraction, each protein product was placed on a tray that was lined with aluminum foil and then it was air-dried overnight. Then, each product was placed in the pellet cooler described in Example 9, where it was dried at about 70–80° C. for 15 min to remove any residual traces of hexane.

EXAMPLE 12

In Vivo Protein Digestibility Experiments

In a preferred embodiment, the in vivo availability (digestibility) of protein in some of the test protein sources that were prepared by co-processing various proportions of whole herring with canola, soya, sunflower and hemp was determined using Atlantic salmon in sea water as the test animal. Two experiments were conducted and the experimental conditions for each are provided in the table 1 below, wherein the flow rate of the oxygenated, filtered, ambient sea water was 6–8 L/min, feeding frequency was twice daily, ration was maximum (fish fed to satiation), and the photoperiod was natural.

TABLE 1

| Variable | Experiment 1 | Experiment 2 |
| --- | --- | --- |
| Fish source | NorAm Aquaculture, Campbell River, BC | NorAm Aquaculture, Campbell River, BC |
| Range in initial mean weight (g) | 76.6–85.8 | 54.2–61.6 |
| Number of fish per tank | 15 | 15 |
| Tanks per diet | 3 | 3 |
| Stocking density (kg/m$^3$) | <8.6 | <6.2 |
| Water temperature (° C.) | 8.9–9.1 | 9.0–9.5 |
| Salinity (g/L) | 29–31 | 28–30 |
| Dissolved oxygen (mg/L) | 8.5–9.4 | 7.5–9.0 |
| Fecal collection period (days) | 14 | 13 |

The design of the digestibility tanks and the fecal collection procedures have been described by Hajen et al. (1993a, b. Aquaculture 112:321–348). The experimental diets consisted of 29.85% test protein product, 69.65% reference diet, and 0.5% chromic oxide as the indigestible marker. Table 2 outlined below provides the ingredient and proximate composition of the reference diet used in the digestibility experiments.

TABLE 2

| Ingredients | (g/kg; air-dry basis) |
| --- | --- |
| LT Anchovy meal | 643.2 |
| Blood flour; spray-dried | 41.0 |
| Pregelatinized wheat starch | 80.9 |
| Raw wheat starch | 26.9 |
| Vitamin supplement[1/] | 18.9 |

TABLE 2-continued

| Ingredients | (g/kg; air-dry basis) |
|---|---|
| Mineral supplement[2/] | 18.9 |
| Menhaden oil; stabilized[3/] | 122.4 |
| Soybean lecithin | 9.46 |
| Choline chloride (60%) | 4.73 |
| Vitamin C, monophosphate (42%) | 3.38 |
| Permapell | 9.46 |
| Finnstim ™ | 14.2 |
| DL-methionine | 1.51 |
| Chromic oxide | 5.00 |
| Level of: | |
| Dry matter | 924–926 |
| Protein | 452–453 |
| Lipid | 184 |
| Ash | 118–123 |

[1/]The vitamin supplement provided the following amounts/kg of diet on an air-dry basis: vitamin A acetate, 4731 IU; cholecalciferol ($D_3$), 2271 IU; DL-α-tocopheryl acetate (E), 284 IU; menadione, 17.0 mg; D-calcium pantothenate, 159.3 mg; pyridoxine HCl, 46.6 mg; riboflavin, 56.8 mg; niacin, 283.8 mg; folic acid, 14.2 mg; thiamine mononitrate, 53.0 mg; biotin, 1.42 mg; cyanocobalamin ($B_{12}$), 0.085 mg; inositol, 378.5 mg.
[2/]The mineral supplement provided the following (mg/kg diet on an air-dry basis): manganese (as $MnSO_4 \cdot H_2O$), 71.0; zinc (as $ZnSO_4 \cdot 7H_2O$), 85.2; cobalt (as $CoCl_2 \cdot 6H_2O$), 2.84; copper (as $CuSO_4 \cdot 5H_2O$), 6.62; iron (as $FeSO_4 \cdot 7H_2O$), 94.6; iodine (as $KIO_3$ and Kl, 1:1), 9.46; fluorine (as NaF), 4.73; selenium (as $Na_2SeO_3$), 0.19; sodium (asNaCl), 1419; magnesium (as $MgSO_4 \cdot 7H_2O$), 378; potassium (as $K_2SO_4$ and $K_2CO_3$, 1:1), 1419.
[3/]Stabilized with 0.5 g santoquin/kg oil.

After adjustment of all experimental diet mashes to a moisture content of 9%, they were cold pelleted using a California model CL type 2 pellet mill. Diet particle size was adjusted to suit fish size. The reference and experimental diets that were used in the study were stored at 5° C. in air-tight containers until required.

The reference and experimental diets (mixture of reference and test diet) and lyophilized fecal samples were analyzed for levels of moisture, protein and chromic oxide at the DFO, West Vancouver Laboratory (WVL) using the procedures described below. Subsequently, the digestibility coefficients for protein were determined for each diet according to Cho et al. (1985. Finfish nutrition in Asia: methodological approaches to research and development. IDRC Ottawa, Ont., 154p.). Then, the digestibility coefficients for each of the protein products themselves were calculated according to Forster (1999. Aquaculture Nutrition 5: 143–145).

The results of chemical analyses of the protein sources used in this study and of the products derived from the co-processing of animal offals (herring or poultry offal) with canola, sunflower, soya and hemp treated as described above are presented in Tables 3–20. The results have been expressed on a dry weight basis and a lipid-free dry weight basis since the mechanical pressing of lipid from the cooked blends of offal and oilseed was variable and not complete. This is a function of the design of the presses and other conventional presses available in industry can be of higher efficiency.

Examples 13 to 16 outlined hereinafter give the results of chemical analyses performed on products obtained in accordance with the process of the invention from: canola and canola-based products, sunflower and sunflower-based products, soya and soya-based products, as well as hemp and hemp-based products. The chemical analyses were performed according to the following methods:

Concentrations of protein, moisture, and ash in the protein sources and products that were prepared as well as in all test diets and fecal samples were determined at the Department of Fisheries and Oceans, West Vancouver Laboratory (DFO-WVL) using the procedures described by Higgs et aL (1979. In J. E. Halver, and K. Tiews, eds. Finfish Nutrition and Fishfeed Technology, Vol. 2. Heenemann Verlagsgesellschaft MbH., Berlin, pp. 191–218).

Similarly, the fatty acid compositions of the cold pressed oils and animal feed grade oils stemming from the press liquids were determined at the same laboratory using the procedures of Silver et al. (1993. In S. J. Kaushik and P. Luquet, eds. Fish nutrition in practice. IVth International Symposium on Fish Nutrition and Feeding, INRA, Paris, pp. 459–468).

Moreover, the chromic acid concentrations in diets and lyophilized fecal samples were determined at the DFO-WVL using the methods of Fenton and Fenton (1979. Can. J. Anim. Sci., 59: 631–634).

Concentrations of crude fibre (AOCS Official Method Ba 6–84), lipid (Troeng, S. 1955. J.A.O.C.S. 32: 124–126), chlorogenic acid (capillary electrophoresis method developed by M. Marianchuk at the POS Pilot Plant Corp.) and sinapine (capillary electrophoresis method developed by P. Kolodziejczyk et al. at the POS Pilot Plant Corp.) in the oilseeds and test protein products as well as measurements of trypsin inhibitor (AOCS Official Method Ba 12–75 reapproved 1997) and urease (AOCS Official Method Ba 9–58 reapproved 1993) activities in soya and sunflower seeds and protein products were determined at the POS Pilot Plant Corp., Saskatoon, SK according to the methods cited in the parentheses.

Determinations of the amino acid concentrations in the oilseeds and test protein products were conducted by AAA Laboratory, Mercer Island, Wash., USA using the general procedures described by Mwachireya et al. (1999. Aquaculture Nutrition 5: 73–82).

Levels of phytic acid in all oilseeds and in the products derived from the co-processing of oilseeds and animal offal were determined by Ralston Analytical Laboratories, Saint Louis, Mo. using the procedures described by Forster et al. (1999. Aquaculture 179:109–125).

Mineral concentrations in the oilseeds and the protein products were determined by Norwest Labs, Surrey, BC using plasma spectroscopy (Higgs et al., 1982. Aquaculture 29: 1–31).

Concentrations of glucosinolate compounds (total of all the different types of glucosinolates) present in canola and canola-based products were measured by Dr. Phil Raney, of Agriculture & Agri-Food Canada, Saskatoon, SK according to the methods of Daun and McGregor (1981. Glucosinolate Analysis of Rapeseed (Canola). Method of the Canadian Grain Commission Revised Edn. Grain Research Laboratory, Canadian Grain Commission, Winnipeg, Manitoba, Canada).

Measurements of soy isoflavones namely, daidzein, glycitein, genistein, and saponins were conducted by Dr. Chung-Ja C. Jackson, of the Guelph Center for Functional Foods, University of Guelph Laboratory Services and have been reported here as the total for the preceding compounds (the methodology in each case is the subject of a patent application and hence has not been published).

EXAMPLE 13

Results Obtained for Canola and Canola-Based Products

Table 3 outlined below gives the percentages of extensively dehulled and partially dehulled Goliath canola seed and of hulls in relation to seed size after dehulling by Forsberg Incorporated, Thief River Falls, Minn.

TABLE 3

| Seed size/fraction | Weight (kg) | % |
|---|---|---|
| Extensively dehulled; large[1] | 35.8 | 39.4 |
| Extensively dehulled; small[1] | 10.8 | 11.8 |
| Partially dehulled; large[2] | 20.4 | 22.4 |
| Partially dehulled; small[2] | 14.3 | 15.7 |
| Hulls; small[3] | 3.33 | 3.66 |
| Hulls; large[3] | 6.49 | 7.13 |
| Total | 91.1 | 100 |

[1] The extensively dehulled canola as identified visually by the lack of hulls in the material was used in the tests reported below (referred to as dehulled canola)
[2] The partially dehulled canola could be subjected to further dehulling, directed into ruminant diets, and/or mixed at a low proportion with animal offal and then co-processed to create a nutritionally upgraded protein source for monogastrics.
[3] The hulls contained little visible evidence of canola meats and had low density.

Table 4 gives the percentages of presscake and oil obtained after cold pressing raw, undehulled and micronized, dehulled Goliath canola seed using a laboratory scale Gusta press.

TABLE 4

| Fraction | Raw, undehulled canola seed | Micronized, dehulled canola seed |
|---|---|---|
| Presscake (%) | 68.3 | 84.0 |
| Oil (%) | 31.7 | 16.0 |
| Total | 100 | 100 |

Table 5 sets out the initial ratios of water from endogenous and exogenous sources to oilseed lipid-free dry matter content and percentage yields (air-dry product, moisture-free product, and lipid-free dry weight product) from the co-processing of different blends of whole herring (WH) with dehulled, micronized (DC) and undehulled raw Goliath canola seed (URC).

TABLE 5

| Protein Product[1] | Initial ratio of hot water to oilseed lipid-free dry matter (w/w) | Air-dry product (%) | Moisture-free product (%) | Lipid-free dry product (%) |
|---|---|---|---|---|
| WH75DC25 | 5:1 | 29.4 | 27.0 | 19.4 |
| WH50DC50 | 5:1 | 32.7 | 31.1 | 20.4 |
| WH37.5DC62.5 | 5:1 | 34.8 | 31.8 | 20.0 |
| WH75URC25 | 4.5:1 | 30.5 | 27.1 | 19.0 |
| WH50URC50 | 5:1 | 30.9 | 29.8 | 21.3 |
| WH25URC75 | 5:1 | 29.6 | 28.6 | 20.5 |

[1] Numbers following WH, DC, and URC refer to initial percentages of these products in the herring/canola seed blends (canola seed was cold pressed to remove a significant portion of the oil and reduce the particle size of the starting material before blending with herring and santoquin; 0.1 g/kg of mixed product before water addition) before their co-processing using cooking temperatures of 90–93° C. and drying temperatures of 77–83° C.

In Table 6, the concentrations of proximate constituents including crude fibre (CF) as well as phytic acid (PA), total glucosinolates (TG), and sinapine in whole herring (WH), dehulled micronized cold pressed Goliath canola (DC), undehulled raw cold pressed Goliath canola (URC), and six protein products produced by the co-processing of different proportions of WH with either DC or URC (expressed on a dry weight basis, DWB or lipid-free dry weight basis, LFDWB) are provided. The composition of a seventh protein product that was produced by hexane extraction of WH50DC50 is also shown (WH50DC50-hexane) together with the apparent protein digestibility coefficients for some of the products (Atlantic salmon in sea water used as the test animal) is also provided.

TABLE 6

| Parameter | | WH | DC | URC | WH75 DC25 | WH50 DC50 | WH50 DC50 (hexane) | WH37.5 DC62.5 | WH75 URC25 | WH50 URC50 | WH25 URC75 |
|---|---|---|---|---|---|---|---|---|---|---|---|
| Dry matter (g/kg) | | 286 | 954 | 936 | 918 | 952 | 928 | 914 | 890 | 966 | 968 |
| Protein (g/kg) | -DWB | 488 | 279 | 348 | 529 | 456 | 693 | 416 | 525 | 414 | 404 |
| | -LFDWB | 870 | 515 | 469 | 735 | 696 | 724 | 662 | 748 | 578 | 564 |
| Lipid (g/kg) | -DWB | 439 | 458 | 258 | 280 | 345 | 42.5 | 372 | 298 | 284 | 284 |
| Ash (g/kg) | -DWB | 70.3 | 48 | 60.9 | 81 | 67.1 | 97.2 | 63 | 77.1 | 78.8 | 73.5 |
| | -LFDWB | 125 | 88.6 | 82.1 | 113 | 102 | 102 | 100 | 110 | 110 | 103 |
| CF (g/kg) | -DWB | —[1] | 28.3 | 66.5 | 21 | 24.7 | 38.3 | 28.9 | — | 69.2 | 76.4 |
| | -LFDWB | — | 52.2 | 89.6 | 29.2 | 37.7 | 40 | 46 | — | 96.6 | 107 |
| PA (g/kg) | -DWB | — | 28.2 | 33.9 | 15.6 | 22.9 | — | 25.5 | 14.2 | 26 | 30.7 |
| | -LFDWB | — | 52 | 45.6 | 21.6 | 35 | — | 40.6 | 20.2 | 36.3 | 42.9 |
| TG (μmoles/g) DWB | — | — | 10.8 | 17.8 | 1.09 | 1.26 | — | 0.92 | 0.44 | 0.9 | 1.06 |
| | -LFDWB | — | 19.9 | 24 | 1.52 | 1.92 | — | 1.47 | 0.63 | 1.26 | 1.49 |
| Sinapine (g/kg) DWB | — | — | 11.2 | 13.1 | 3.16 | 4.94 | — | 5.8 | 2.92 | 5.18 | 5.68 |
| | -LFDWB | — | 20.7 | 17.7 | 4.39 | 7.54 | — | 9.23 | 4.16 | 7.23 | 7.94 |
| In vivo protein digestibility (%) | | — | — | — | 88.9 | 94.4 | — | 94.9 | — | 94.4 | 96.4 |

[1] Not determined

Table 7 provides the concentrations of essential amino acids (% of protein) and selected minerals (μg/g of lipid-free dry matter) in whole herring (WH), micronized, dehulled, cold pressed Goliath canola (DC), undehulled, raw cold pressed Goliath canola (URC), and six protein products produced by the co-processing of different propotions of WH with either DC or URC. The amino acid and mineral concentrations in a seventh protein product, produced by hexane extraction of WH50DC50 are also shown (WH50DC50-hexane).

EXAMPLE 14

Results Obtained for Sunflower and Sunflower-Based Products

In Table 9, initial ratios of water from endogenous and exogenous sources to oilseed lipid-free dry matter and percentage yields (air-dry product, moisture-free product, and lipid-free dry weight product) from the co-processing of different blends of whole herring (WH) or poultry offal (PO) with dehulled, raw sunflower seed, batch 1 (DRSF$_1$) or batch 2 (DRSF$_2$) are provided.

TABLE 7

| Parameter | WH | DC | URC | WH75 DC25 | WH50 DC50 | WH50 DC50 (hexane) | WH37.5 DC62.5 | WH75 URC25 | WH50 URC50 | WH25 URC75 |
|---|---|---|---|---|---|---|---|---|---|---|
| A) Essential amino acids | | | | | | | | | | |
| Arginine | 6.66 | 7.09 | [1] | 7.23 | 7.44 | 7.5 | 6.93 | — | — | — |
| Histidine | 1.97 | 2.84 | — | 2.62 | 2.69 | 2.69 | 2.59 | — | — | — |
| Isoleucine | 4.56 | 4.28 | — | 4.81 | 4.78 | 4.71 | 4.51 | — | — | — |
| Leucine | 8.4 | 7.47 | — | 8.15 | 8.22 | 8.01 | 7.71 | — | — | — |
| Lysine | 5.47 | 3.87 | — | 4.92 | 4.85 | 7.01 | 4.4 | — | — | — |
| Methionine + Cystine | 3.97 | 4.55 | — | 4.54 | 4.63 | 4.25 | 4.47 | — | — | — |
| Phenylalanine + Tyrosine | 7.55 | 7.26 | — | 8.08 | 8.14 | 7.93 | 7.54 | — | — | — |
| Threonine | 4.97 | 4.62 | — | 4.83 | 4.89 | 4.73 | 4.61 | — | — | — |
| Tryptophan | 1.51 | 1.72 | — | 1.69 | 1.63 | 0.92 | 1.69 | — | — | — |
| Valine | 5.51 | 5.34 | — | 5.66 | 5.75 | 5.23 | 5.36 | — | — | — |
| B) Minerals | | | | | | | | | | |
| Calcium | 30303 | 4061 | 5183 | 23905 | 14594 | 16202 | 12195 | 22088 | 14458 | 10244 |
| Phosphorus | 19073 | 18760 | 17278 | 23299 | 21971 | 23746 | 20384 | 21127 | 20675 | 20777 |
| Magnesium | 1961 | 7929 | 7631 | 4388 | 5934 | 6921 | 6098 | 4161 | 6289 | 8599 |
| Sodium | 5704 | <100 | <100 | 3026 | 1443 | 1598 | 1220 | 2081 | 772 | 495 |
| Potassium | 14260 | 18566 | 18142 | 12104 | 12348 | 14293 | 12544 | 10244 | 11234 | 12019 |
| Copper | 5.2 | 3.09 | <1.00 | 15.4 | 6.09 | 12.0 | 8.36 | 11.4 | 10.7 | 9.81 |
| Zinc | 101 | 70.8 | 66.7 | 116 | 101 | 106 | 79.6 | 96.2 | 74.6 | 71.1 |

[1] Not determined.

Table 8 sets out the percentages of selected fatty acids and of saturated, unsaturated, (n-6), (n-3) and n-3 highly unsaturated fatty acids (n-3 HUFA; 20:5 (n-3)+22:6 (n-3)) in whole herring (WH), undehulled raw cold pressed Goliath canola (URC), and the press lipids resulting from the co-processing of different proportions of WH with DC or URC.

TABLE 8

| | | | Lipid source | | | | | |
|---|---|---|---|---|---|---|---|---|
| Fatty acid | WH | URC | WH75 DC25 | WH50 DC50 | WH37.5 DC62.5 | WH75 URC25 | WH50 URC50 | WH25 URC75 |
| 18:1 (n-9) | 18.9 | 62.7 | 35.7 | 49.9 | 55.0 | —[1] | 22 | 25.7 |
| 18:2 (n-6) | 0.74 | 21.4 | 7.34 | 15.0 | 17.5 | — | 10.3 | 17 |
| 18:3 (n-3) | 0.12 | 8.79 | 3.28 | 0.34 | 7.40 | — | 2.67 | 4.28 |
| 20:5 (n-3) | 9.66 | 0.00 | 15.4 | 3.75 | 2.71 | — | 4.21 | 5.83 |
| 22:6 (n-3) | 8.96 | 0.00 | 7.00 | 4.11 | 1.38 | — | 6.69 | 0 |
| Total Saturated | 22.2 | 4.32 | 20.3 | 12.4 | 9.88 | — | 22.1 | 20.3 |
| Total Unsaturated | 77.8 | 95.7 | 79.7 | 87.6 | 90.1 | — | 77.9 | 79.7 |
| Total (n-6) | 4.82 | 21.7 | 8.56 | 15.5 | 17.9 | — | 14.1 | 20 |
| Total (n-3) | 31.3 | 9.96 | 28.0 | 14.7 | 11.8 | — | 21.7 | 15.3 |
| Total n-3 HUFA | 18.6 | 0 | 22.4 | 7.86 | 4.09 | — | 10.09 | 5.813 |

[1] Not determined

TABLE 9

| Protein Product[1] | Initial ratio of hot water to oilseed lipid-free dry matter (w/w) | Air-dry product (%) | Moisture-free product (%) | Lipid-free dry product (%) |
|---|---|---|---|---|
| WH75DRSF$_1$25 | 5:1 | 30.4 | 28.2 | 19.7 |
| WH50DRSF$_1$50 | 3:1 | 31.6 | 29.0 | 19.4 |
| WH25DRSF$_1$75 | 3:1 | 31.7 | 31.1 | 19.9 |
| PO50DRSF$_2$50 | 6:1 | 46.9 | 43.0 | 31.3 |

[1]Numbers following WH, DRSF and PO refer to initial percentages of these products in the herring/sunflower seed and poultry/sunflower seed blends (sunflower seed was cold pressed to remove a significant portion of the oil and reduce the particle size of the starting material before blending with herring or poultry and santoquin; 0.1 g/kg of mixed product before water addition) before their co-processing using cooking temperatures of 90–93° C. and drying temperatures of 77–83° C.

Table 10 gives the concentrations of proximate constituents including crude fibre (CF), phytic acid (PA), trypsin inhibitor activity (TI), urease activity (UA) and chlorogenic acid (CA) content in whole herring (WH), poultry offal (PO), dehulled, raw cold pressed sunflower, batch 1 (DRSF$_1$), and five protein products produced by the co-processing of different proportions of WH or PO with either DRSF$_1$ or dehulled, raw cold pressed sunflower, batch 2 (DRSF$_2$) (expressed on a dry weight basis, DWB or lipid-free dry weight basis, LFDWB). The composition of a sixth protein product that was produced by hexane extraction of WH50DRSF$_1$50 is also shown (WH50DRSF$_1$50-hexane) together with the apparent protein digestibility coefficients for some of the products (Atlantic salmon in sea water used as the test animal).

Table 11 gives the concentrations of essential amino acids (% of protein) and selected minerals (μg/g of lipid-free dry matter) in whole herring (WH), poultry offal (PO), dehulled, raw, cold pressed sunflower, batch 1 (DRSF$_1$), and four protein products produced by the co-processing of different proportions of WH or PO with either DRSF$_1$ or DRSF$_2$. The concentrations in a fifth protein product, produced by hexane extraction of WH50DRSF$_1$50, is also shown (WH50DRSF$_1$50-hexane).

TABLE 10

| Parameter | | WH | PO | DRSF$_1$ | WH75 DRSF$_1$25 | WH50 DRSF$_1$50 | WH50 DRSF$_1$50 (hexane) | WH25 DRSF$_1$75 | PO50 DRSF$_2$50[2] |
|---|---|---|---|---|---|---|---|---|---|
| Dry matter (g/kg) | | 286 | 328 | 938 | 928 | 919 | 930 | 981 | 918 |
| Protein (g/kg) | | | | | | | | | |
| -DWB | | 488 | 370 | 351 | 535 | 479 | 695 | 441 | 382 |
| -LFDWB | | 870 | 673 | 594 | 766 | 715 | 718 | 689 | 525 |
| Lipid (g/kg) | -DWB | 439 | 451 | 409 | 302 | 330 | 32.2 | 360 | 271 |
| Ash (g/kg) | -DWB | 70.3 | 104 | 50.7 | 126 | 118 | 95.8 | 115 | 58.9 |
| -LFDWB | | 125 | 189 | 85.8 | 181 | 176 | 99 | 180 | 80.8 |
| CF (g/kg) | -DWB | —[1] | — | 34 | 19.2 | 32.4 | 37.5 | 27.2 | 124 |
| -LFDWB | | — | — | 57.5 | 27.5 | 48.4 | 38.8 | 42.5 | 170 |
| PA (g/kg) | -DWB | — | — | 31.4 | 14.2 | 23.3 | — | 30.7 | 25.9 |
| -LFDWB | | — | — | 53.2 | 20.4 | 34.8 | — | 47.9 | 35.6 |
| TI (TIA units/g) LFDWB | | — | — | 1603 | 1766 | 1730 | — | 1268 | |
| UA (ApH) | | | | 0.06 | 0.03 | 0.02 | — | 0.01 | |
| CA (g/kg) | -DWB | — | — | 14.9 | 2.6 | 5.65 | — | 8.58 | 6.22 |
| -LFDWB | | — | — | 27.7 | 3.72 | 8.43 | — | 13.4 | 8.53 |
| In vivo protein digestibility (%) | | — | — | — | — | 97.6 | — | 97.1 | — |

[1]Not determined
[2]DRSF$_2$ co-processed with PO was pressed, partially dehulled (58%) animal feed grade with a DM, protein, lipid, ash and crude fibre content (g/kg expressed on a dry weight basis except DM) of 918, 379, 211, 59.4, and 123, respectively.

TABLE 11

| Parameter | WH | PO | DRSF$_1$[2/] | WH75 DRSF$_1$25 | WH50 DRSF$_1$50 | WH50 DRSF$_1$50 (hexane) | WH25 DRSF$_1$75 | PO50 DRSF$_2$50[3/] |
|---|---|---|---|---|---|---|---|---|
| A) Essential amino acids | | | | | | | | |
| Arginine | 6.66 | 8.11 | 10.6 | 7.66 | 8.58 | 8.64 | 9.16 | 8.52 |
| Histidine | 1.97 | 1.91 | 2.59 | 2.34 | 2.42 | 2.40 | 2.41 | 2.56 |
| Isoleucine | 4.56 | 3.19 | 4.45 | 4.28 | 4.45 | 4.52 | 4.38 | 4.56 |
| Leucine | 8.40 | 5.88 | 6.32 | 7.16 | 6.96 | 7.11 | 6.57 | 6.95 |
| Lysine | 5.47 | 5.28 | 3.67 | 6.88 | 5.57 | 5.57 | 4.30 | 4.59 |
| Methionine + Cystine | 3.97 | 3.16 | 3.61 | 3.71 | 3.41 | 3.61 | 3.42 | 3.25 |
| Phenylalanine + Tyrosine | 7.55 | 5.45 | 7.66 | 7.46 | 7.65 | 7.82 | 7.55 | 7.72 |
| Threonine | 4.97 | 3.67 | 4.15 | 4.40 | 4.17 | 4.10 | 4.06 | 3.99 |
| Tryptophan | 1.51 | 0.75 | 1.28 | 1.27 | 0.78 | 1.27 | 1.03 | 1.40 |
| Valine | 5.51 | 4.03 | 5.19 | 5.09 | 5.29 | 4.86 | 5.08 | 4.81 |
| B) Minerals | | | | | | | | |
| Calcium | 30303 | —[1/] | 1930 | 33810 | 15055 | 14999 | 10226 | 12420 |
| Phosphorus | 19073 | — | 22188 | 29950 | 25011 | 23221 | 23573 | 15843 |
| Magnesium | 1961 | — | 10805 | 4493 | 7503 | 7544 | 9987 | 4992 |
| Sodium | 5704 | — | 19.8 | 2223 | 1454 | 1378 | 836 | 852 |
| Potassium | 14260 | — | 23090 | 11085 | 14406 | 15110 | 15036 | 9894 |
| Copper | 5.20 | — | 39.1 | 21.6 | 36.5 | 28.9 | 37.0 | 39.9 |
| Zinc | 101 | — | 124 | 99.0 | 118 | 124 | 123 | 93.0 |

[1/]Not determined.
[2/]Values for essential amino acids were derived from unpressed DRSF$_1$.
[3/]DRSF$_2$ co-processed with PO was partially dehulled (58%) animal feed grade with a DM, protein, lipid, ash and crude fibre composition (g/kg expressed on a dry weight basis except DM) of 918, 379, 211, 59.4, and 123, respectively.

In Table 12, percentages of selected fatty acids and of saturated, unsaturated, (n-6), (n-3) and n-3 highly unsaturated fatty acids (n-3 HUFA; 20:5 (n-3)+22:6 (n-6)) in whole herring (WH), poultry offal (PO), dehulled, raw, cold pressed sunflower, batch 1 (DRSF$_1$), and the press lipids resulting from the co-processing of different proportions of WH or PO with DRSF$_1$ or dehulled, raw, cold pressed sunflower, batch 2 (DRSF$_2$).

EXAMPLE 15

Results Obtained for Soya and Soya-Based Products

In Table 13, the initial ratios of water from endogenous and exogenous sources to oilseed, lipid-free dry matter and percentage yields (air-dry product, moisture-free product, and lipid-free dry weight product) from the co-processing of different blends of whole herring (WH) with dehulled, micronized (DSY) and undehulled raw soya seed (URSY).

TABLE 12

| | | | | Lipid source | | | |
|---|---|---|---|---|---|---|---|
| Fatty acid | WH | PO | DRSF$_1$ | WH75 DRSF$_1$25 | WH50 DRSF$_1$50 | WH25 DRSF$_1$75 | PO50 DRSF$_2$50[2/] |
| 18:1 (n-9) | 18.9 | 39.9 | 9.39 | 21.6 | 18.2 | —[1/] | 17.9 |
| 18:2 (n-6) | 0.74 | 17.6 | 76.6 | 22.4 | 25.3 | — | 38.7 |
| 18:3 (n-3) | 0.12 | 2.56 | 0.11 | 4.28 | 0.42 | — | 0.80 |
| 20:5 (n-3) | 9.66 | 0.00 | 0.00 | 3.15 | 3.67 | — | 0.00 |
| 22:6 (n-3) | 8.96 | 0.00 | 0.00 | 6.04 | 7.87 | — | 0.00 |
| Total Saturated | 22.2 | 33.9 | 12.1 | 16.9 | 14.5 | — | 37.7 |
| Total Unsaturated | 77.8 | 66.17 | 87.9 | 83.1 | 85.5 | — | 62.3 |
| Total (n-6) | 4.82 | 17.8 | 76.6 | 29.5 | 36.3 | — | 38.7 |
| Total (n-3) | 31.3 | 2.56 | 0.12 | 19.2 | 17.7 | — | 0.80 |
| Total n-3 HUFA | 18.6 | 0.00 | 0.00 | 9.19 | 11.5 | — | 0.00 |

[1/]Not determined.
[2/]DRSF$_2$ co-processed with PO was partially dehulled (58%) animal feed grade with a DM, crude protein, lipid, ash and crude fibre content (g/kg expressed on a dry weight basis except DM) of 918, 379, 211, 59.4, and 123, respectively.

TABLE 13

| Protein Product[1] | Initial ratio of hot water to oilseed lipid-free dry matter (w/w) | Air-dry product (%) | Moisture-free product (%) | Lipid-free dry product (%) |
|---|---|---|---|---|
| WH75DSY25 | 5:1 | 14.2 | 13.6 | 10.3 |
| WH50DSY50 | 5:1 | 36.7 | 34.9 | 26.4 |
| WH25DSY75 | 4:1 | 48.3 | 43.8 | 32.7 |
| WH75URSY25 | 5:1 | 20.7 | 19.1 | 15.0 |
| WH50URSY50 | 5:1 | 29.9 | 27.4 | 21.1 |
| WH25URSY75 | 4:1 | 43.8 | 38.4 | 33.7 |

[1]Numbers following WH, DSY and URSY refer to initial percentages of these products in the herring/soya blends (soya seed was ground to reduce the particle size of the starting material before blending with herring and santoquin; 0.1 g/kg of mixed product before water addition) prior to their co-processing using cooking temperatures of 90–93° C. and drying temperatures of 77–83° C.

Table 14 shows the concentrations of proximate constituents including crude fibre (CF) as well as phytic acid (PA), total saponins, total isoflavones (TIF), urease activity (UA), and trypsin inhibitor activity (TI) in whole herring (WH), dehulled, micronized, soya (DSY), undehulled, raw soya (URSY), and six protein products produced by the co-processing of different proportions of WH with either DSY or URSY (expressed on a dry weight basis, DWB or lipid-free dry weight basis, LFDWB). The composition of a seventh protein product that was produced by hexane extraction of WH50DSY50 is also shown (WH50DSY50-hexane) together with the apparent protein digestibility coefficients for some of the products (Atlantic salmon in sea water used as the test animal).

Table 15 provides concentrations of essential amino acids (% of protein) and selected minerals ($\mu$g/g of lipid-free dry matter) in whole herring (WH), dehulled, micronized, soya (DSY), and three protein products produced by the co-processing of different proportions of WH with DSY. The concentrations in a fourth protein product, produced by hexane extraction of WH50DSY50, is also shown (WH50DSY50-hexane).

TABLE 14

| Parameter | WH | DSY | URSY | WH75 DSY25 | WH50 DSY50 | WH50 DSY50 (hexane) | WH25 DSY75 | WH75 URSY25 | WH50 URSY50 | WH25 URSY75 |
|---|---|---|---|---|---|---|---|---|---|---|
| Dry matter (g/kg) | 286 | 921 | 897 | 956 | 950 | 936 | 907 | 921 | 916 | 878 |
| Protein (g/kg) DWB | — | 488 | 396 | 334 | 526 | 531 | 647 | 507 | 497 | 429 | 388 |
| -LFDWB | 870 | 522 | 434 | 696 | 701 | 668 | 680 | 633 | 557 | 504 |
| Lipid (g/kg) DWB | — | 439 | 242 | 230 | 244 | 242 | 30.1 | 254 | 215 | 230 | 232 |
| Ash (g/kg) DWB | — | 70.3 | 50.3 | 57.1 | 77.2 | 59.4 | 71.2 | 52.2 | 85.8 | 66.4 | 56.8 |
| -LFDWB | 125 | 66.4 | 74.2 | 102 | 78.4 | 73.4 | 70.0 | 109 | 86.2 | 74.0 |
| CF (g/kg) DWB | — | —[1] | 16.2 | 44.6 | 16.0 | 16.3 | 18.7 | 19.3 | 46.6 | 67.5 | 82.2 |
| -LFDWB | — | 21.3 | 57.9 | 21.2 | 21.5 | 19.3 | 25.9 | 59.3 | 87.6 | 107 |
| PA (g/kg) DWB | — | — | 14.9 | 20.0 | 9.87 | 11.9 | — | 12.9 | 12.5 | 15.9 | 17.2 |
| -LFDWB | — | 19.6 | 25.9 | 13.1 | 15.7 | — | 17.3 | 15.9 | 20.7 | 22.4 |
| Saponins (mg/g) -DWB | — | 1.60 | — | 0.71 | 1.02 | — | 1.18 | — | — | — |
| -LFDWB | — | 2.11 | — | 0.94 | 1.35 | — | 1.58 | — | — | — |
| TIF ($\mu$g/g) DWB | — | 2305 | — | 899 | 1402 | — | 1622 | — | — | — |
| -LFDWB | — | 3041 | — | 1189 | 1850 | — | 2174 | — | — | — |
| UA ($\Delta$pH) | — | 0.01 | 2.48 | 0.02 | 0.01 | — | 0.02 | 0.09 | 0.28 | 0.35 |
| TI (TIA units/g) LFDWB | — | — | 7813 | 101563 | 871 | 1017 | — | 553 | 1902 | 8296 | 11138 |
| In vivo protein digestibility (%) | — | — | — | — | 96.2 | — | 94.2 | — | 93.5 | 88.2 |

[1] Not determined

TABLE 15

| Parameter | WH | DSY | WH75 DSY25 | WH50 DSY50 | WH50 DSY50 (hexane) | WH25 DSY75 |
|---|---|---|---|---|---|---|
| A) Essential amino acids | | | | | | |
| Arginine | 6.66 | 7.57 | 7.39 | 7.17 | 7.64 | 7.38 |
| Histidine | 1.97 | 2.48 | 2.45 | 2.42 | 2.49 | 2.47 |
| Isoleucine | 4.56 | 4.65 | 4.67 | 4.60 | 4.83 | 4.57 |
| Leucine | 8.40 | 7.53 | 7.66 | 7.48 | 8.00 | 7.58 |
| Lysine | 5.47 | 6.14 | 7.13 | 6.70 | 6.72 | 6.52 |
| Methionine + Cystine | 3.97 | 2.46 | 3.30 | 2.70 | 3.20 | 2.97 |
| Phenylalanine + Tyrosine | 7.55 | 8.56 | 8.21 | 8.27 | 8.78 | 8.47 |
| Threonine | 4.97 | 4.21 | 4.57 | 4.37 | 4.44 | 4.30 |
| Tryptophan | 1.51 | 1.45 | 1.38 | 1.31 | 1.20 | 1.35 |
| Valine | 5.51 | 4.54 | 5.26 | 5.04 | 4.79 | 4.99 |
| B) Minerals | | | | | | |
| Calcium | 30303 | 2637 | 22138 | 14304 | 9958 | 8646 |
| Phosphorus | 19073 | 9339 | 19648 | 14998 | 11897 | 12385 |
| Magnesium | 1961 | 3638 | 2684 | 2597 | 2324 | 2971 |
| Sodium | 5704 | <5.00 | 2228 | 1290 | 1157 | 668 |
| Potassium | 14260 | 27646 | 17157 | 16942 | 13769 | 17587 |
| Copper | 5.20 | 21.6 | 36.7 | 26.7 | 23.6 | 27.2 |
| Zinc | 101 | 57.3 | 75.3 | 65.5 | 65.6 | 67.8 |

Table 16 provides the percentages of selected fatty acids and of saturated, unsaturated, (n-6), (n-3) and n-3 highly unsaturated fatty acids (n-3 HUFA; 20:5 (n-3)+22:6 (n-3)) in whole herring (WH), micronized, dehulled, soya (DSY), undehulled, raw soya (URSY), and the press lipids resulting from the co-processing of different proportions of WH with DSY or URSY.

TABLE 16

| | | | | Lipid source | | | | | |
|---|---|---|---|---|---|---|---|---|---|
| Fatty acid | WH | DSY | URSY | WH75 DSY25 | WH50 DSY50 | WH25 DSY75 | WH75 URSY25 | WH50 URSY50 | WH25 URSY75 |
| 18:1 (n-9) | 18.9 | 17.8 | 17.4 | 17.9 | 18.86 | 15.8 | 18.4 | 14.5 | 13.1 |
| 18:2 (n-6) | 0.74 | 57.5 | 57.2 | 6.39 | 10.1 | 22.8 | 8.24 | 13.0 | 25.2 |
| 18:3 (n-3) | 0.12 | 9.79 | 10.2 | 2.67 | 2.19 | 4.38 | 2.99 | 2.79 | 4.60 |
| 20:5 (n-3) | 9.66 | 0.00 | 0.00 | 11.2 | 6.92 | 5.58 | 10.4 | 7.85 | 5.17 |
| 22:6 (n-3) | 8.96 | 0.00 | 0.00 | 8.55 | 8.11 | 6.77 | 9.10 | 8.33 | 6.29 |
| Total Saturated | 22.2 | 13.4 | 13.3 | 22.1 | 25.7 | 22.8 | 21.0 | 26.4 | 26.8 |
| Total Unsaturated | 77.8 | 86.6 | 86.7 | 77.9 | 74.3 | 77.2 | 79.0 | 73.6 | 73.2 |
| Total (n-6) | 4.82 | 57.9 | 57.8 | 9.26 | 10.1 | 22.8 | 8.24 | 13.0 | 25.2 |
| Total (n-3) | 31.3 | 10.0 | 10.4 | 29.3 | 25.6 | 24.5 | 32.7 | 27.5 | 22.1 |
| Total n-3 HUFA | 18.6 | 0.00 | 0.00 | 19.7 | 15.0 | 12.3 | 19.5 | 16.2 | 11.5 |

EXAMPLE 16

Results Obtained for Hemp and Hemp-Based Products

In Table 17, the initial ratios of water from endogenous and exogenous sources to oilseed lipid-free dry matter and percentage yields (air-dry product, moisture-free product, and lipid-free dry weight product) from the co-processing of different blends of whole herring (WH) with dehulled, sterilized (DHP) and undehulled sterilized hemp seed (UHP).

TABLE 17

| Protein Product[1/] | Initial ratio of hot water to oilseed lipid-free dry matter (w/w) | Air-dry product (%) | Moisture-free product (%) | Lipid-free dry product (%) |
|---|---|---|---|---|
| WH75DHP25 | 5:1 | 3.04 | 2.93 | 2.80 |
| WH50DHP50 | 4:1 | 20.4 | 19.9 | 15.1 |
| WH25DHP75 | 3:1 | 37.3 | 32.6 | 23.2 |
| WH75UHP25 | 5:1 | 15.0 | 14.7 | 11.9 |

TABLE 17-continued

| Protein Product[1/] | Initial ratio of hot water to oilseed lipid-free dry matter (w/w) | Air-dry product (%) | Moisture-free product (%) | Lipid-free dry product (%) |
|---|---|---|---|---|
| WH50UHP50 | 5:1 | 36.9 | 36.4 | 31.4 |
| WH25UHP75 | 4:1 | 40.3 | 39.7 | 34.2 |

[1/]Numbers following WH, DHP and UHP refer to initial percentages of these products in the herring/hemp blends (UHP seed was cold pressed to remove a significant portion of the oil and to reduce the particle size of the starting material before blending with herring and santoquin; 0.1 g/kg of mixed product before water addition) prior to their co-processing using cooking temperatures of 90–93° C. and drying temperatures of 77–83° C.

Table 18 gives the concentrations of proximate constituents including crude fibre (CF) as well as phytic acid (PA) in whole herring (WH), dehulled, sterilized hemp (DHP), cold pressed undehulled, sterilized hemp (UHP), and six protein products produced by the co-processing of different proportions of WH with either DHP or UHP (expressed on a dry weight basis, DWB or lipid-free dry weight basis, LFDWB). The composition of a seventh protein product that was produced by hexane extraction of WH50DHP50 is also shown (WH50DHP50-hexane) together with the apparent protein digestibility coefficients for some of the products (Atlantic salmon in sea water used as the test animal).

dry matter) in whole herring (WH), dehulled, sterilized hemp (DHP), and three protein products produced by the co-processing of different proportions of WH with DHP or UHP. The concentrations in a fourth protein product, produced by hexane extraction of WH50DHP50, are also shown (WH50DHP50-hexane).

TABLE 18

| Parameter | | WH | DHP | UHP | WH75 DHP25 | WH50 DHP50 | WH50 DHP50 (hexane) | WH25 DHP75 | WH75 UHP25 | WH50 UHP50 | WH25 UHP75 |
|---|---|---|---|---|---|---|---|---|---|---|---|
| Dry matter (g/kg) | | 286 | 963 | 952 | 976 | 975 | 969 | 874 | 983 | 986 | 986 |
| Protein (g/kg) -DWB | | 488 | 313 | 311 | 579 | 575 | 721 | 533 | 504 | 429 | 448 |
| -LFDWB | | 870 | 632 | 399 | 765 | 757 | 746 | 750 | 625 | 498 | 520 |
| Lipid (g/kg) DWB | — | | 439 | 505 | 221 | 243 | 240 | 33.4 | 289 | 193 | 138 | 138 |
| Ash (g/kg) DWB | — | | 70.3 | 59.2 | 63.6 | 99.2 | 88.7 | 118 | 87.6 | 77.4 | 116 | 117 |
| -LFDWB | | 125 | 120 | 81.6 | 131 | 117 | 122 | 123 | 95.9 | 135 | 136 |
| CF (g/kg) | -DWB | —[1/] | 44.1 | 251 | 14.7 | 39.1 | 51.9 | 52.5 | 153 | 237 | 239 |
| -LFDWB | | — | 89.2 | 322 | 19.4 | 51.4 | 53.7 | 73.9 | 189 | 275 | 277 |
| PA (g/kg) | -DWB | — | 37.5 | 33.7 | 12.5 | 35.2 | — | 47.7 | 15.3 | 25.3 | 24.6 |
| -LFDWB | | — | 75.7 | 43.3 | 16.5 | 46.3 | — | 67.1 | 18.9 | 29.3 | 28.6 |
| In vivo protein digestibility (%) | | — | — | — | — | 96.1 | — | 99.9 | — | — | — |

[1/] Not determined

Table 19 shows the concentrations of essential amino acids (% of protein) and selected minerals ($\mu$g/g of lipid-free

TABLE 19

| Parameter | WH | DHP | WH75 DHP25 | WH50 DHP50 | WH50 DHP50 (hexane) | WH25 DHP75 |
|---|---|---|---|---|---|---|
| A) Essential amino acids | | | | | | |
| Arginine | 6.66 | 14.0 | 8.48 | 10.4 | 10.6 | 11.7 |
| Histidine | 1.97 | 2.81 | 2.53 | 2.58 | 2.62 | 2.71 |
| Isoleucine | 4.56 | 4.24 | 4.97 | 4.72 | 4.79 | 4.54 |
| Leucine | 8.40 | 6.72 | 8.32 | 7.70 | 7.90 | 7.31 |
| Lysine | 5.47 | 3.81 | 7.93 | 6.45 | 6.39 | 5.35 |
| Methionine + Cystine | 3.97 | 4.11 | 4.11 | 4.08 | 4.02 | 3.91 |

TABLE 19-continued

| Parameter | WH | DHP | WH75 DHP25 | WH50 DHP50 | WH50 DHP50 (hexane) | WH25 DHP75 |
|---|---|---|---|---|---|---|
| Phenylalanine + Tyrosine | 7.55 | 8.41 | 8.62 | 8.48 | 8.68 | 8.52 |
| Threonine | 4.97 | 3.71 | 4.80 | 4.37 | 4.36 | 4.06 |
| Tryptophan | 1.51 | 0.40 | 0.41 | 0.75 | 1.39 | 0.75 |
| Valine | 5.51 | 4.97 | 5.58 | 5.37 | 5.19 | 5.20 |
| B) Minerals | | | | | | |
| Calcium | 30303 | 1792 | 35867 | 16734 | 17616 | 7789 |
| Phosphorus | 19073 | 31048 | 29641 | 28340 | 27652 | 31219 |
| Magnesium | 1961 | 14202 | 3668 | 8772 | 8531 | 12375 |
| Sodium | 5704 | 37.8 | 2558 | 1646 | 1708 | 1162 |
| Potassium | 14260 | 18880 | 10882 | 11876 | 13559 | 14419 |
| Copper | 5.20 | 30.8 | 18.7 | 22.5 | 26.5 | 25.4 |
| Zinc | 101 | 169 | 101 | 125 | 141 | 154 |

Table 20 sets out the percentages of selected fatty acids and of saturated, unsaturated, (n-6), (n-3) and n-3 highly unsaturated fatty acids (n-3 HUFA; 20:5 (n-3)+22:6 (n-3)) in whole herring (WH), dehulled, sterilized hemp (DHP), undehulled, sterilized hemp (UHP), and the press lipids resulting from the co-processing of different proportions of WH with DHP or UHP.

TABLE 20

| | Lipid source | | | | | | | | |
|---|---|---|---|---|---|---|---|---|---|
| Fatty acid | WH | DHP | UHP | WH75 DHP25 | WH50 DHP50 | WH25 DHP75 | WH75 UHP25 | WH50 UHP50 | WH25 UHP75 |
| 18:1(n-9) | 18.9 | 5.48 | 7.72 | 8.30 | 8.63 | 6.51 | 15.5 | 17.1 | 14.2 |
| 18:2(n-6) | 0.74 | 57.7 | 56.4 | 30.9 | 42.7 | 49.8 | 18.7 | 18.9 | 33.6 |
| 18:3(n-3) | 0.12 | 19.8 | 19.0 | 10.9 | 15.0 | 16.8 | 7.12 | 7.32 | 11.5 |
| 20:5(n-3) | 9.66 | 0.16 | 0.02 | 4.30 | 2.72 | 1.55 | 4.63 | 3.46 | 0.05 |
| 22:6(n-3) | 8.96 | 0.00 | 0.00 | 3.94 | 2.68 | 1.91 | 7.05 | 5.94 | 3.00 |
| Total Saturated | 22.2 | 12.5 | 10.0 | 24.0 | 16.4 | 14.6 | 20.8 | 21.4 | 16.7 |
| Total Unsaturated | 77.8 | 87.5 | 90.0 | 76.0 | 83.6 | 85.4 | 79.2 | 78.6 | 83.3 |
| Total (n-6) | 4.82 | 57.7 | 60.6 | 31.6 | 42.8 | 49.9 | 21.8 | 20.9 | 36.5 |
| Total (n-3) | 31.3 | 20.3 | 19.1 | 23.4 | 24.2 | 22.1 | 25.9 | 22.6 | 18.3 |
| Total n-3 HUFA | 18.6 | 0.16 | 0.02 | 8.25 | 5.39 | 3.46 | 11.7 | 9.40 | 3.05 |

The co-processing of animal offal with the foregoing oilseeds pretreated using the methods according to the present invention resulted in nutritionally upgraded protein sources suitable for use.

The yields of these protein sources were good for all canola and sunflower-based products and this was also true for the soya and hemp-based products when higher concentrations ($\geq 50\%$ in initial mixture) of these treated oilseeds were used. All of the yields were likely underestimated of true values owing to the difficulty in quantitatively collecting all of the material from the drier portion of the fish meal machine.

The oilseed-based protein products contained high concentrations of protein that was highly bioavailable to salmon (generally 89% to 100% of the protein was noted to be digestible in Atlantic salmon held in sea water depending upon the source and percentage of the oilseed in the initial mixture of offal and oilseed and the pretreatment of the latter and the offal before their co-processing). Moreover, these protein products had significantly reduced concentrations of all heat labile and water soluble antinutritional factors except phytic acid relative to their respective initial levels in the oilseeds. Phytic acid was concentrated during the co-processing of offal with oilseed and the extent depended upon its initial concentration in the oilseed used in the process.

The fatty acid compositions of the animal feed grade lipid sources produced by the process largely reflected the fatty acid compositions and lipid levels contributed by the different proportions of the animal offal and oilseed used initially in the process. This provides considerable scope to produce specially designed lipid sources that are tailored to meet the fatty acid needs of various animal species.

The cold-pressing of oilseeds before they are blended with animal offal yielded high quality economically valuable human food grade oils whose fatty acid compositions can be varied, depending upon market requirements and the selection of the oilseed or combination of oilseeds that are used in cold pressing. The high value of the cold pressed oils which can be generated in greater quantities wen undehulled seeds rather than dehulled seeds are cold pressed will contribute to the overall economic viability of the co-processing of animal offals with oilseeds.

The hulls resulted from the dehulling of the oilseeds used in this study and the condensed solubles produced by co-processing animal offal(s) with oilseed(s) likely will be excellent organic fertilizer constituents. This is because they collectively contain soluble protein, some lipid and minerals and other components that can be degraded by aerobic or anaerobic bacterial processes into value-added fertilizer products making the overall process described herein economically viable.

The rapid heat treatment of oilseeds to inactivate enzymes like the protease inhibitors in soya and destruct heat labile antinutritional components coupled with the dehulling of oilseeds yield protein and lipid-rich products that potential can be used directly in high energy feeds such as those destined for aquatic species like salmon (salmon grower diets frequently contain 25–35% lipid on an air-dry basis and they are produced by extrusion processing technology).

We claim:

1. A process for preparation of nutritionally upgraded oilseed meals, which are protein and lipid-rich and have a reduced fibre content, and plant oils from oilseeds for use in fish or other non-human animal diets or human foods comprising the steps of:
   providing a source of oilseed;
   subjecting said oilseed to heat treatment to substantially reduce the concentration of at least some antinutritional components normally present in said oilseed to obtain heat-treated particulate seed;
   providing a source of unhydrolyzed animal offal;
   blending said heat-treated seed in particulate form with said animal offal, and if required water together with an antioxident, to form a mixture thereof;
   cooking said mixture under conditions selected to substantially improve protein digestibility, and substantially free cellular water present in said animal offal, as well as to facilitate separation of protein from the lipid in said animal offal and said oilseeds to obtain a cooked mixture; and
   separating said cooked mixture into a stickwater fraction, a moisture containing protein-rich fraction, and an animal feed grade oil fraction.

2. In a process for the preparation of nutritionally unaraded oilseed meal from co-processing of animal offal with oilseed for use in fish or other non-human animal feeds, wherein the process includes the steps of providing a source of oilseed and cold pressing said oilseed to substantially reduce the particle size of said oilseed to yield a high value human grade oil and protein and lipid-rich meal with reduced fibre content; the improvement comprising the further steps of:
   providing a source of unhydrolyzed animal offal;
   blending said protein and lipid-rich meal with said animal offal, and if required water together with an antioxident, to form a blended mixture thereof;
   cooking said blended mixture under conditions selected to substantially improve protein digestibility, and substantially free cellular water present in said animal offal, as well as to facilitate separation of protein from the lipid in said animal offal and said oilseeds to obtain a cooked mixture; and
   separating said cooked mixture into a stickwater fraction, a moisture containing protein-rich fraction, and an animal feed grade oil fraction.

3. The process according to claim 2, further including the step of extracting said protein and lipid-rich meals with a solvent.

4. The process according to claim 3, further including the step of stabilizing said plant oils by adding an antioxidant.

5. The process according to claim 3, further including the step of drying said protein-rich fraction to reduce its moisture content to below about 10%.

6. The process according to claim 3, wherein said heat treatment is a rapid heat treatment.

7. The process according to claim 3, wherein said oilseed is selected from the group consisting of canola, rape seed, soybeans, sunflower seed, flax seed, mustard seed, cotton seed, hemp and mixtures thereof.

8. The process according to claim 3, wherein said oilseed is selected from the group consisting of canola, sunflower seed, flax seed, mustard seed and mixtures thereof.

9. The process according to claim 3, wherein said animal offal is selected from the group consisting of fish processing waste, whole fish, fish by-catch, squid offal, whole birds without feathers, beef offal, poultry offal, lamb offal and mixtures thereof.

10. The process according to claim 3, wherein said oilseed and said animal offal are mixed together in a ratio of about 10:90 to about 90:10 by weight.

11. The process according to claim 2, said process further comprising the steps of:
    subjecting said oilseed to heat treatment at a temperature and time sufficient to deactivate, destroy or reduce concentration of some antinutritional factors present in said oilseed, improve digestibility and reduce moisture content;
    providing said source of unhydrolyzed animal product selected from the group consisting of, fish processing waste, whole fish, fish by-catch, squid offal, beef offal, lamb offal and whole birds without feathers;
    cooking said mixture at a temperature for a time sufficient to improve protein digestibility and free the bound water present in said animal offal and facilitate the separation of protein from the lipid in said animal product and said oilseed,
    removing fluid comprised of lipid and water soluble components from said mixture to obtain a pressed cake; and,
    drying the pressed cake at a temperature for a time sufficient for the pressed cake to reach a moisture content of about 7–10% to provide a protein concentrate.

12. The process of claim 11, including the further step of condensing the stickwater.

13. The process according to claim 11, wherein said heat treatment is carried out at a temperature of about 100–115° C. for a time of about 1.5 to about 30 mins.

14. The process according to claim 11, further including the step of dehulling said oilseed.

15. The process according to claim 14, wherein said dehulling is carried out by impact or disc process coupled with a gravity screening and/or air-classification process.

16. The process according to claim 11, wherein said oilseed is selected from the group consisting of canola, rape seed, soybeans, sunflower seed, flax seed, mustard seed, cotton seed, hemp and mixtures thereof.

17. The process according to claim 16, wherein said oilseed is selected from the group consisting of canola, soybeans, sunflower seed, cotton seed and mixtures thereof.

18. The process according to claim 17, wherein said offal is fish offal.

19. The process of claim 11, further including the step of:
    adding a palatability enhancer to said mixture prior to the cooking step or after the pressing step.

20. The process according to claim 11, further including the step of adding an antioxidant to the mixture prior to the cooking step or after the pressing step.

21. The process according to claim 19, wherein said palatability enhancer is selected from the group consisting of products based on krill, euphausiids, squid and mixtures thereof.

22. The process according to claim 20, wherein said antioxidant is selected from the group consisting of ethoxyquin, butylated hydroxyanisole, butylated hydroxytoluene, Vitamin E and mixtures thereof.

23. In a process for preparation of nutritionally upgraded oilseed meals, which are protein and lipid-rich and have a reduced fibre content, and plant oils from oilseeds for use in fish or other non-human animal diets or human foods the improvement comprising the steps of:

provided a source of oilseed;

subjecting said oilseed to a drying step to obtain oilseed having a moisture content of less than 10% to thereby improve dehulling of said oilseed;

dehulling said oilseed to provide a source of dehulled oilseed;

providing a source of unhydrolyzed animal offal;

blending said dehulled oilseed with said animal offal, and if required water together with an antioxident, to form a mixture thereof;

cooking said mixture under conditions selected to substantially improve protein digestibility, and substantially free cellular water and lipids present in said animal offal, as well as to facilitate separation of protein from the lipid in said animal offal and said oilseeds to obtain a cooked mixture; and separating said cooked mixture into a stickwater fraction, a moisture containing protein-rich fraction, and an animal feed grade oil fraction.

24. The process according to claim 1, wherein said oilseed is treated to dephytinize said oilseed.

25. The process according to claim 2, wherein said oilseed is treated to dephytinize said oilseed.

26. The process according to claim 23, wherein said oilseed is treated to dephytinize said oilseed.

27. The process according to claim 1, further comprising the step of extracting said protein rich fraction with a solvent.

28. The process according to claim 2, further including the step of extracting said protein and lipid rich meals with a solvent.

29. The process according to claim 23, further comprising the step of extracting said protein rich fraction with a solvent.

30. The process according to claim 27, wherein said solvent includes hexane.

31. The process according to claim 28, wherein said solvent includes hexane.

32. The process according to claim 29, wherein said solvent includes hexane.

* * * * *